(12) United States Patent
Takahashi et al.

(10) Patent No.: US 8,318,359 B2
(45) Date of Patent: Nov. 27, 2012

(54) ELECTRODE FOR LITHIUM SECONDARY BATTERY, LITHIUM SECONDARY BATTERY AND METHOD FOR PRODUCING THE SAME

(75) Inventors: Keiichi Takahashi, Hyogo (JP); Masaya Ugaji, Osaka (JP); Yasutaka Kogetsu, Osaka (JP); Shinji Mino, Osaka (JP); Nobuaki Nagao, Gifu (JP); Masaki Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 11/886,848

(22) PCT Filed: Nov. 7, 2006

(86) PCT No.: PCT/JP2006/322147
§ 371 (c)(1),
(2), (4) Date: Sep. 21, 2007

(87) PCT Pub. No.: WO2007/052803
PCT Pub. Date: May 10, 2007

(65) Prior Publication Data
US 2009/0104528 A1 Apr. 23, 2009

(30) Foreign Application Priority Data
Nov. 7, 2005 (JP) .................................. 2005-322095

(51) Int. Cl.
*H01M 4/76* (2006.01)
*H01M 4/13* (2010.01)
*H01M 4/58* (2010.01)
*H01M 4/80* (2006.01)
*H01M 4/66* (2006.01)
*H01M 4/68* (2006.01)

(52) U.S. Cl. ................. 429/238; 429/218.1; 429/231.95; 429/235; 429/245

(58) Field of Classification Search ............. 429/231.95, 429/245, 218.1, 235, 238
See application file for complete search history.

(56) References Cited

U.S. PATENT DOCUMENTS
5,494,762 A * 2/1996 Isoyama et al. ............... 429/221
(Continued)

FOREIGN PATENT DOCUMENTS
EP 1 231 654 A1 8/2002
(Continued)

OTHER PUBLICATIONS
Japanese Notification of Reasons for Refusal and Written Opinion, with English Translations, issued in Japanese Patent Application No. JP 2007-542845, dated May 8, 2008.
(Continued)

*Primary Examiner* — Patrick Ryan
*Assistant Examiner* — Julian Anthony
(74) *Attorney, Agent, or Firm* — McDermott Will & Emery LLP

(57) ABSTRACT

An electrode for a lithium secondary battery including a sheet-like current collector and an active material layer carried on the current collector. The active material layer is capable of absorbing and desorbing lithium, and the active material layer includes a plurality of columnar particles having at least one bend. An angle $\theta_1$ formed by a growth direction of the columnar particles from a bottom to a first bend of the columnar particles, and a direction normal to the current collector is preferably 10° or more and less than 90°. When $\theta_{n+1}$ is an angle formed by a growth direction of the columnar particles from an n-th bend counted from a bottom of the columnar particles to an (n+1)-th bend, and the direction normal to the current collector, and n is an integer of 1 or more, $\theta_{n+1}$ is preferably 0° or more and less than 90°.

18 Claims, 12 Drawing Sheets

U.S. PATENT DOCUMENTS

| | | | |
|---|---|---|---|
| 5,631,100 | A | 5/1997 | Yoshino et al. |
| 5,866,204 | A | 2/1999 | Robbie et al. |
| 6,248,422 | B1 | 6/2001 | Robbie et al. |
| 6,649,033 | B2 | 11/2003 | Yagi et al. |
| 6,887,623 | B2 | 5/2005 | Fujimoto et al. |
| 7,192,673 | B1 | 3/2007 | Ikeda et al. |
| 7,195,842 | B1 | 3/2007 | Fujimoto et al. |
| 7,235,330 | B1 | 6/2007 | Fujimoto et al. |
| 7,241,533 | B1 * | 7/2007 | Ikeda et al. .................. 429/233 |
| 7,485,942 | B2 | 2/2009 | Ahn et al. |
| 7,816,032 | B2 * | 10/2010 | Honda et al. ............... 429/218.1 |
| 2005/0048369 | A1 | 3/2005 | Koshina et al. |
| 2005/0095506 | A1 | 5/2005 | Klaassen |
| 2005/0100790 | A1 | 5/2005 | Ota et al. |
| 2005/0118503 | A1 | 6/2005 | Honda et al. |
| 2006/0024586 | A1 | 2/2006 | Tamura et al. |
| 2007/0031733 | A1 | 2/2007 | Kogetsu et al. |
| 2007/0059601 | A1 | 3/2007 | Natsume et al. |
| 2007/0207386 | A1 | 9/2007 | Konishiike et al. |

FOREIGN PATENT DOCUMENTS

| | | |
|---|---|---|
| EP | 1 246 278 A1 | 10/2002 |
| EP | 1 912 270 A1 | 4/2008 |
| JP | 05-249299 | 9/1993 |
| JP | 06-187994 | 7/1994 |
| JP | 2001-502013 | 2/2001 |
| JP | 2002-170482 | 6/2002 |
| JP | 2002-170557 | 6/2002 |
| JP | 2003-017040 | 1/2003 |
| JP | 2003-303586 | 10/2003 |
| JP | 2004-127561 | 4/2004 |
| JP | 2005-011725 | 1/2005 |
| JP | 2005-196970 | 7/2005 |
| JP | 2005-235397 | 9/2005 |
| JP | 2006-196447 | 7/2006 |
| KR | 10-2005-021892 | 7/2005 |
| RU | 2099819 C1 | 12/1997 |
| WO | WO 2004/109839 A1 | 12/2004 |

OTHER PUBLICATIONS

English Translation of Korean Office Action and Written Opinion issued in Korean Patent Application No. KR 10-2008-7009704, previously filed on Feb. 20, 2009.

M. Molinari et al., "Visible photoluminescence in amorphous $SiN_x$ thin films prepared by reactive evaporation," Applied Physics Letter, vol. 77, No. 22, 2000, pp. 3499-3501.

J. M. Nieuwenhuizen et al., "Microfractography of thin films," Philips Technical Review, pp. 87-91, vol. 27, 1966.

K. C. Mohite et al., "Characterization of silicon oxynitride thin films deposited by electron beam physical vapor deposition technique," Material Letters, vol. 57, 2003, pp. 4170-4175.

European Search Report issued in European Patent Application No. EP 06823060.6-2119/1953850 PCT/JP2006/322147, dated Mar. 4, 2009.

Yasutaka Shiraki et al., "Morphological Control of Thin Film," pp. 287-290 and pp. 298-299 with partial English.

K. Robbie et al., "Sculptured thin films and glancing angle deposition: Growth mechanics and application," Journal of Vacuum Science and Technology A. pp. 1460-1465, vol. 15, 1997.

Motofumi Suzuki et al., "Integrated Sculptured Thin Films," Japanese Journal of Applied Physics, L358-L359, Part 2, vol. 40, 2001.

R. Messier et al., "Engineered sculptured nematic thin films," Journal of Vacuum Science and Technology, A15, 1997 pp. 2148.

K. Robbie et al., "Advanced techniques for glancing angel deposition," Journal of Vacuum Science and Technology, B. pp. 1115-1122, vol. 16, 1998.

Russian Office Action, with English translation, issued in Russian Patent Application No. 2008122926/09(027586), mailed Mar. 4, 2010.

United States Office Action issued in U.S. Appl. No. 11/363,945, mailed Jan. 28, 2010.

United States Office Action issued in U.S. Appl. No. 11/363,945 dated Jan. 28, 2010.

United States Office Action issued in U.S. Appl. No. 11/363,945, mailed Aug. 18, 2010.

Yasutaka Shiraki et al., "Morphological Control of Thin Film," pp. 287-290 and pp. 298-299 with partial English Translation; Mar. 15, 2003.

"Fabrication of $SiN_x$ film by ion-beam-assisted vapor deposition," Iwase, Kobayashi, Masaki, Morisaki, Proceeding of the School of Engineering of Tokai University, vol. 31, No. 1, 1991, pp. 23-30.

US Office Action issued in U.S. Appl. No. 13/252,808 issued on Jun. 5, 2012.

US Office Action issued in U.S. Appl. No. 13/248,858 dated Feb. 3, 2012.

* cited by examiner

F I G. 5
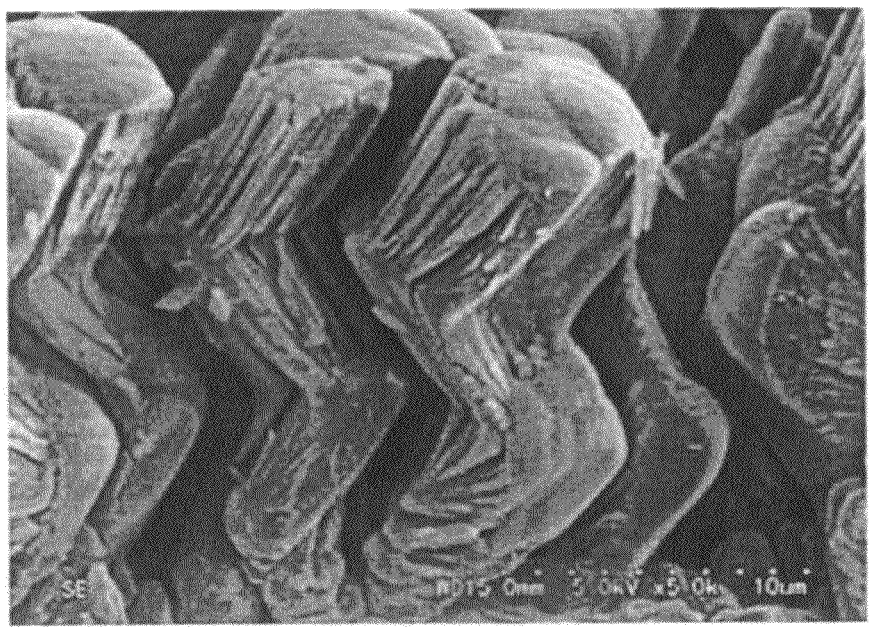
F I G. 6
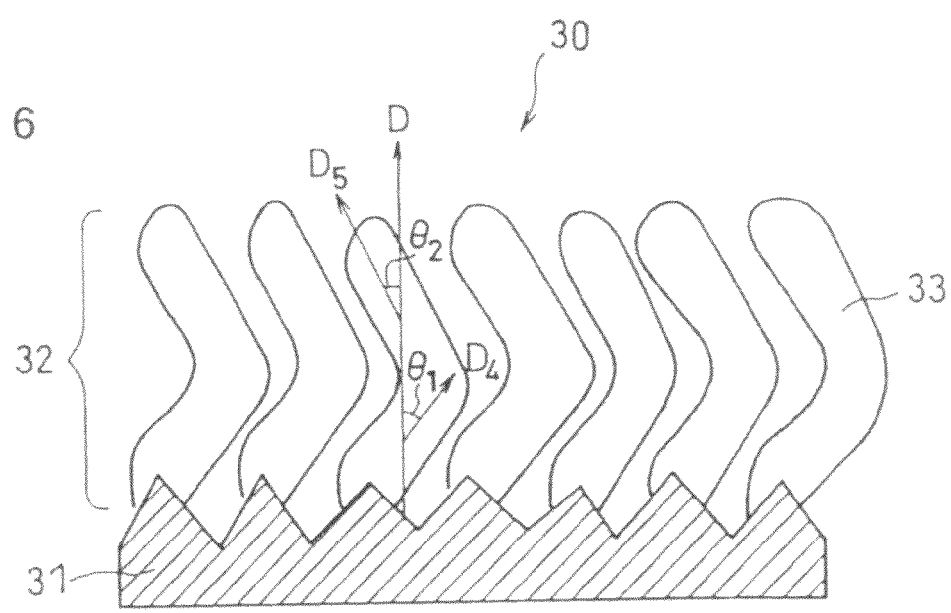

F I G. 8A
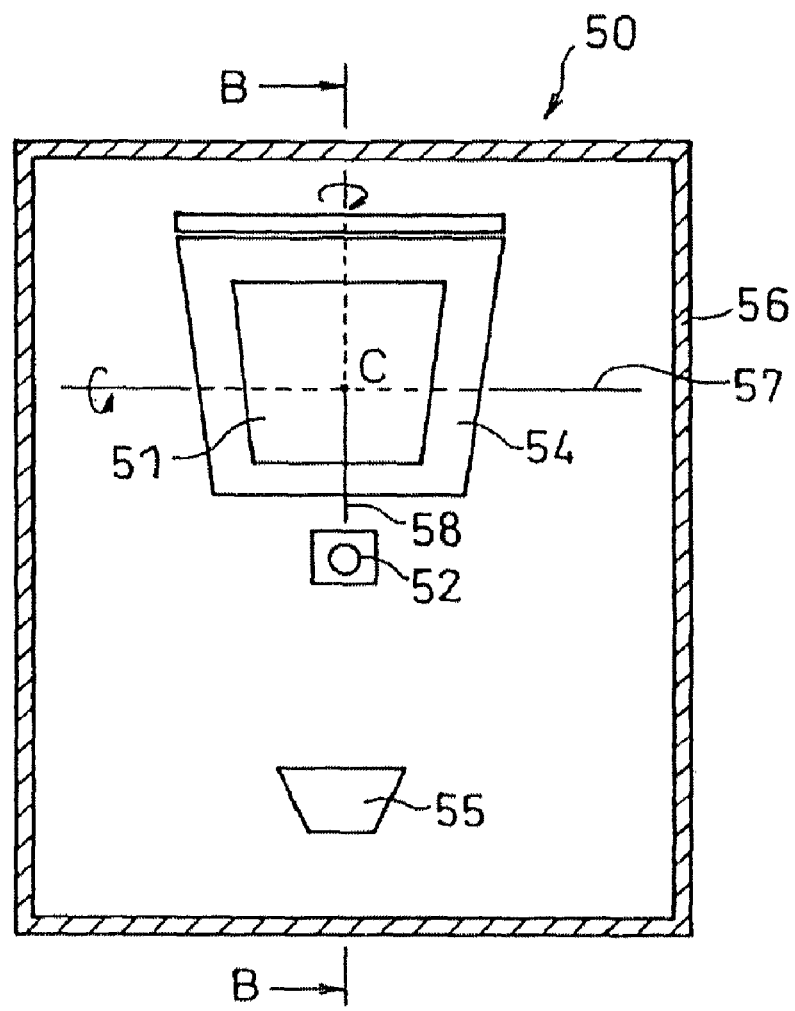

F I G. 1 1 A
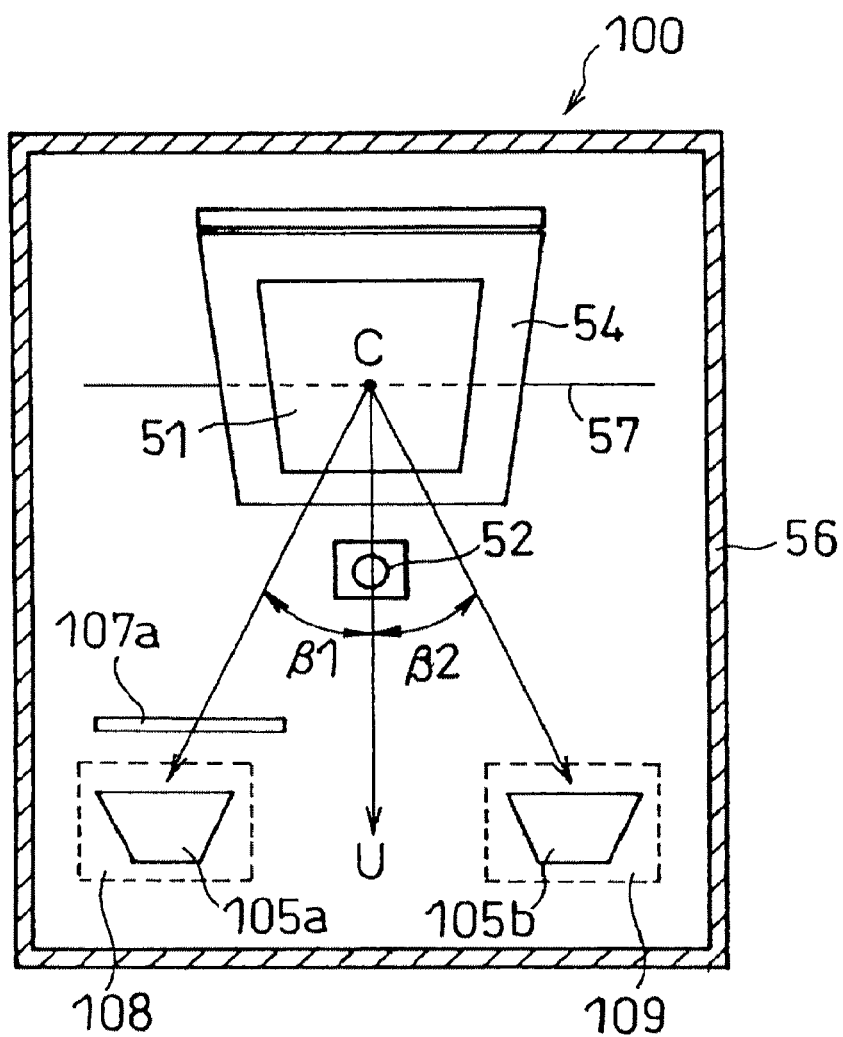

ELECTRODE FOR LITHIUM SECONDARY BATTERY, LITHIUM SECONDARY BATTERY AND METHOD FOR PRODUCING THE SAME

RELATED APPLICATIONS

This application is the U.S. National Phase under 35 U.S.C. §371 of International Application No. PCT/JP2006/322147 filed on Nov. 7, 2006, which in turn claims the benefit of Japanese Application No. 2005-322095, filed on Nov. 7, 2005, the disclosures of which Applications are incorporated by reference herein.

TECHNICAL FIELD

The invention relates to an electrode for a lithium secondary battery, a lithium secondary battery and a method for producing the same.

BACKGROUND ART

In recent years, in association with development of portable equipment such as personal computers and mobile phones, demands for batteries as power sources thereof have been increased. The batteries for used in the foregoing applications are required to be used at normal temperature as well as to have a high energy density and excellent cycle characteristics.

In order to satisfy these requirements, new active materials with high capacity have been developed in a positive electrode and a negative electrode. Among these, a simple substance, oxides or alloys of silicon (Si) or tin (Sn) capable of providing an extremely high capacity are regarded as promising as a negative electrode active material. Moreover, Li-containing composite oxides such as $LiNiO_2$ are regarded as promising as a positive electrode active material.

However, an active material excellent in capability of absorbing and desorbing lithium expands and contracts considerably during charge and discharge. As a result, an electrode including a current collector is warped remarkably, easily causing wrinkles or cuts. In addition, space is created between the electrode and the separator, and uneven charge and discharge reactions tend to occur easily. There is a concern, therefore, that the battery may cause local deterioration in performance.

For such problems, one proposal suggests that a negative electrode be provided with space for relieving expansion stress of an active material. This proposal intends to suppress warps or waves of the negative electrode and prevent a deterioration of cycle characteristics. For example, Patent Document 1 suggests that columnar particles of silicon be formed on a current collector. Further, Patent Document 2 suggests that on a current collector, a pattern forming for orderly arranging particles of an active material capable of alloying with lithium be performed. Furthermore, Patent Documents 3 and 4 suggest that columnar particles forming a negative electrode active material be slanted against a direction normal to the surface of a current collector.

Both Patent Documents 1 and 2 relate to forming an active material in a columnar structure upright in a direction normal to a sheet-like current collector. Structured as such, much of the active material is not opposed to an active material in a counter electrode but is opposed to an exposed portion of the electrode current collector. For example, in the case where a negative electrode is of a columnar structure, lithium having been supplied from a positive electrode active material during charge is not absorbed in an active material of the negative electrode but readily precipitated on an exposed portion of the negative electrode current collector. As a result, during discharge, lithium is not efficiently desorbed from the negative electrode, causing a reduction in charge and discharge efficiency.

According to Patent Documents 3 and 4, it is possible to obtain a positive electrode or negative electrode active material layer while relieving the expansion of active material. In terms of a capacity retention rate, Patent Documents 3 and 4 are superior to Patent Documents 1 and 2.

Patent Document 5, although not relating to a method for producing a negative electrode for a lithium secondary battery, proposes a method for growing helical-shaped columnar particles. The helical-shaped columnar particles are formed on a substrate by vapor deposition. In this process, the slanted angle of the substrate is continuously changed with respect to an incident direction of vapor by rotating two axes orthogonal to each other.

Patent Document 1: Japanese Laid-Open Patent Publication No. 2003-303586
Patent Document 2: Japanese Laid-Open Patent Publication No. 2004-127561
Patent Document 3: Japanese Laid-Open Patent Publication No. 2005-196970
Patent Document 4: Japanese Laid-Open Patent Publication No. Hei 6-187994
Patent Document 5: U.S. Pat. No. 5,866,204

DISCLOSURE OF THE INVENTION

Problem to be Solved by the Invention

However, the columnar particles undergo stress in contacting portions between the active material and the current collector, and the stress is produced by expansion of the active material during charge. If the thickness of the active material layer is increased in order to increase the energy density, the stress in the normal direction is increased. This stress is intensively applied to the contacting portions of the columnar particles with the current collector when the columnar particles are slanted (in the case of Patent Documents 3 and Patent Document 4). Therefore, after charge and discharge cycles are repeated for a long period of time, stress is repeatedly applied to the contacting portions of the columnar particles with the current collector, and thus cracks readily occur.

Moreover, the columnar particles tend to grow increasingly in the width direction (the direction perpendicular to the incident direction of vapor of a material supplying source and parallel to the surface of the current collector). It is possible therefore to provide a sufficient gap between the particles in the direction perpendicular to the width direction; however, it is impossible to provide a sufficient gap in the width direction. For this reason, increasing the thickness of the active material layer in order to obtain a large energy density will cause distortion, wrinkles, or cuts of the electrode.

FIG. 1 and FIG. 2 conceptually illustrate a part of an electrode comprising a current collector 2 and an active material layer 1 carried on the current collector 2, wherein the active material layer includes a plurality of columnar particles 3. FIG. 1 is a cross section perpendicular to the width direction of the columnar particles 3. FIG. 2 is a cross section parallel to the width direction of the columnar particles 3, corresponding to the side view of FIG. 1.

Means for Solving the Problems

An electrode for a lithium secondary battery of the invention includes a sheet-like current collector and an active material layer carried on the current collector, wherein the active material layer includes a plurality of columnar particles having at least one bend, and the columnar particles are capable of absorbing and desorbing lithium.

It is preferable that an angle $\theta_1$ formed by a growth direction of the columnar particles from a bottom (i.e., a contacting portion of the columnar particles with the current collector) to a first bend of the columnar particles, and a direction normal to the current collector is 10° or more and less than 90°.

It is preferable that when $\theta_{n+1}$ is an angle formed by a growth direction of the columnar particles from an n-th bend counted from a bottom of the columnar particles (i.e., a contacting portion of the columnar particles with the current collector) to an (n+1)-th bend and the direction normal to the current collector, and n is an integer of 1 or more, the $\theta_{n+1}$ is 0° or more and less than 90°.

The columnar particles may each have only one bend or a plurality of bends.

The columnar particles may each have a zigzag shape or a helical shape.

A preferred porosity P of the active material layer is $10\% \leq P \leq 70\%$.

It is preferable that when the electrode of the invention is a negative electrode, the columnar particles include at least one selected from the group consisting of silicon simple substance and a silicon oxide.

It is preferable that when the electrode of the invention is a positive electrode, the columnar particles include at least one selected from the group consisting of $LiCoO_2$, $LiNiO_2$, $LiMn_2O_4$, $LiCo_{x1}Ni_{y1}Mn_{z1}O_2$ (where 0<x1, y1, z1<1 and x1+y1+z1=1), $LiCo_{x2}Ni_{y2}Al_{z2}O_2$ (where 0<x2, y2, z2<1 and x2+y2+z2=1) and $LiNi_{y3}Mn_{z3}O_2$ (where 0<y3, z3<1 and y3+z3=1).

The invention further relates to a lithium secondary battery comprising the foregoing electrode, a counter electrode and an electrolyte having ion conductivity interposed therebetween.

It should be noted that in the case where the slanted angle of a substrate is variously changed as in Patent Document 4, for example, it is possible to grow the columnar particles to be in a helical shape. It is considered therefore that the growth of the columnar particles in the width direction can be suppressed. However, in an actual production process, the slanted angle of a substrate is not readily changed variously. Particularly when a continuous length of current collector is wound out from a roll to form an electrode continuously and then wound up into a roll, it is difficult to change the slanted angle of the current collector variously during the process of producing the electrode.

Therefore, another aspect of the invention proposes a method for producing an electrode for a lithium ion secondary battery comprising a first step of allowing particles of an active material to be incident on a sheet-like current collector at a first incident angle of +10° to +60° for depositing the active material, and a second step of allowing particles of an active material to be incident on the current collector at a second incident angle of −10° to −60° for depositing the active material.

It should be noted that the incident directions of particles when the incident angle is plus and when the incident angle is minus are opposite to each other.

For example, the first step includes a step of allowing particles of the active material generated from a material supplying source at a first position corresponding to the first incident angle to be incident on the surface of the current collector, and the second step includes a step of allowing particles of the active material generated from a material supplying source at a second position corresponding to the second incident angle to be incident on the surface of the current collector.

In other words, the invention is a method for producing an electrode for a lithium secondary battery, in which a vapor of material supplying source produced by evaporating the material supplying source alternately at the first position and the second position is allowed to be incident on the surface of the current collector, thereby to deposit an active material in order to form an active material layer carried on the current collector. This method includes a production method in which the incident direction of a vapor of material supplying source from a first position and the incident direction of a vapor of material supplying source from a second position are each slanted against a direction normal to the current collector.

The first position and the second position are, for example, symmetrical to each other with respect to a plane perpendicular to the surface of the current collector. It is preferable that the plane perpendicular to the surface of the current collector passes through the center of the sheet-like current collector in the longitudinal direction.

The foregoing method includes processes in which, for example, (i) one material supplying source is moved alternately between the first position and the second position in order that the material supplying source is evaporated alternately at the first position and the second position; (ii) one of two material supplying sources is placed at the first position and the other is placed at the second position, and the two material supplying sources are evaporated alternately; and (iii) one material supplying source is placed in a region including both the first position and the second position, and the material supplying source is evaporated alternately at the first position and the second position.

Herein, a bend means a point at which a growth direction of particles (grains) becomes discontinuous. Specifically, when a growth direction of particles is expressed by a curve, the point at which the differential of the curve becomes discontinuous (i.e., the inflection point of the differential curve) is referred to as a bend. The curve expressing a growth direction of particles can be obtained, for example, by analyzing a cross sectional SEM photograph of columnar particles. From the cross sectional SEM photograph, the growth direction of columnar particles from the current collector toward the surface of the active material layer can be identified.

In the invention, a direction normal to the current collector means a direction being perpendicular to the surface of the current collector as well as departing from the surface of the current collector. Microscopically, the surface of a current collector is rough in many cases, but visually, it is flat. For this reason, a direction normal to the current collector is uniquely determined.

The angle formed by a growth direction of columnar particles and a direction normal to the current collector can be determined, for example, using an electron microscope (SEM etc). In the case of using an electron microscope, the active material layer is cut in parallel with the direction normal to the current collector as well as in parallel with the growth direction of columnar particles, and the cross section thereof is observed.

It is preferable that the angle formed by a growth direction of columnar particles and a direction normal to the current collector is determined by measuring at least 10 columnar particles and then determining a mean value thereof. It is preferable that the evaluation of the angle formed by a growth direction of columnar particles and a direction normal to the current collector is performed using an electrode immediately after production, an electrode included in an unused battery immediately after production or an electrode included in a battery that has been subjected to charge and discharge only 10 times or less.

EFFECT OF THE INVENTION

When an active material layer absorbs and desorbs lithium, the columnar particles thereof undergo stress due to expansion and contraction of the active material layer. However, according to the invention, such stress can be dispersed at a bend. As a result, it is possible to prevent the stress from being intensively applied to the interfaces between the columnar particles and the current collector (the bottoms of the columnar particles), thereby to prevent cracks from readily occurring in the columnar particles. This can maintain the connection between the active material layer and the current collector.

Moreover, when seen from the counter electrode along a direction normal thereto, an exposed portion of the current collector forming the electrode of the invention is significantly small. As a result, even when lithium supplied from the counter electrode during charge is precipitated on the exposed portion of the current collector, the amount of lithium precipitated thereon becomes small. Consequently, lithium can be efficiently desorbed from the electrode during discharge, resulting in an improvement in charge and discharge efficiency.

According to the production method of the invention, the incident direction of vapor from a material supplying source to the current collector can be switched alternately between the two slanted directions. Further, since such an operation can be carried out by controlling the placed position of a material supplying source, the necessity of installing a rotational axis movable in a plurality of directions in a substrate can be eliminated.

According to the invention, it is possible to slant the incident direction of vapor from the material supplying source to the current collector in one direction, while also slanting it in the direction orthogonal to the one direction. Because of this, when the columnar particles are slanted against a direction normal to the current collector, a sufficient gap can be provided between the columnar particles in the width direction thereof. Hence, stress is dispersed at a bend, and in addition, expansion stress during charge can be relieved by the gap. As a result, distortion, wrinkles, or cuts of the electrode can be suppressed, and thus the charge and discharge cycle characteristics of a lithium secondary battery can be improved.

BRIEF DESCRIPTION OF THE DRAWINGS

[FIG. 5] An SEM photograph of a part of the electrode for a lithium secondary battery including columnar particles each having two bends according to one embodiment of the invention.

[FIG. 6] A magnified view of a part of an electrode for a lithium secondary battery according to another embodiment of the invention.

[FIG. 8A] A schematic view illustrating one example of a production apparatus for an electrode for a lithium secondary battery.

[FIG. 11A] A schematic view illustrating yet another example of a production apparatus for an electrode for a lithium secondary battery.

BEST MODE FOR CARRYING OUT THE INVENTION

The invention will be hereinafter described with reference to the drawings, but the invention is not limited to the description given below as long as it has features recited in claims.

Figure 1:
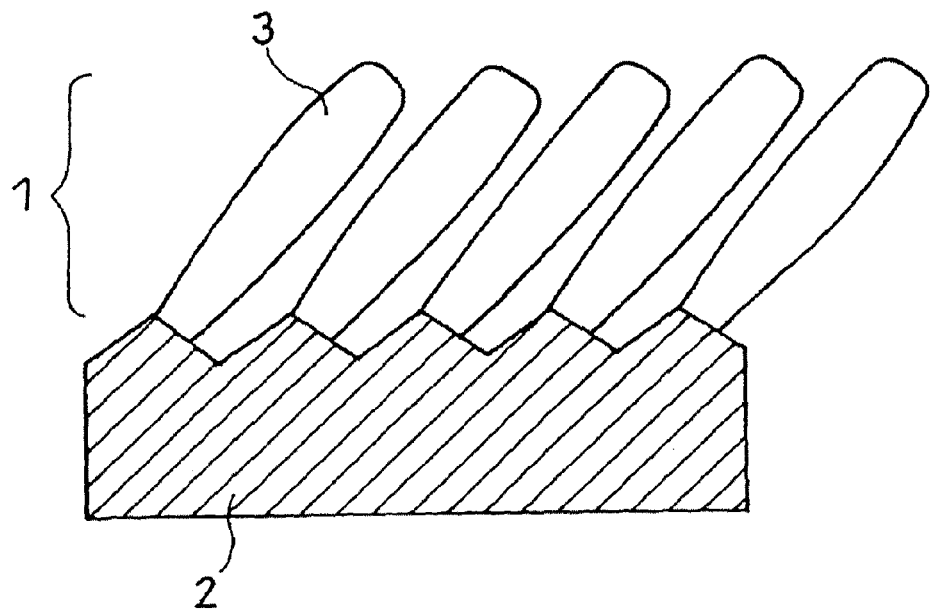
[FIG. 1] A cross sectional view of a part of the conventional electrode for a lithium secondary battery.
Figure 2:
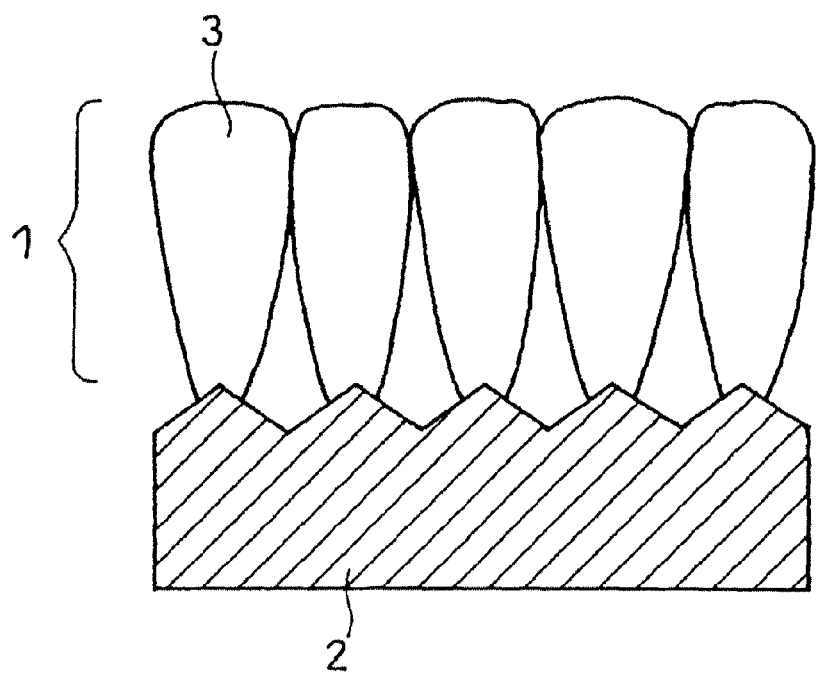
[FIG. 2] A side view of the electrode of FIG. 1.
Figure 3:
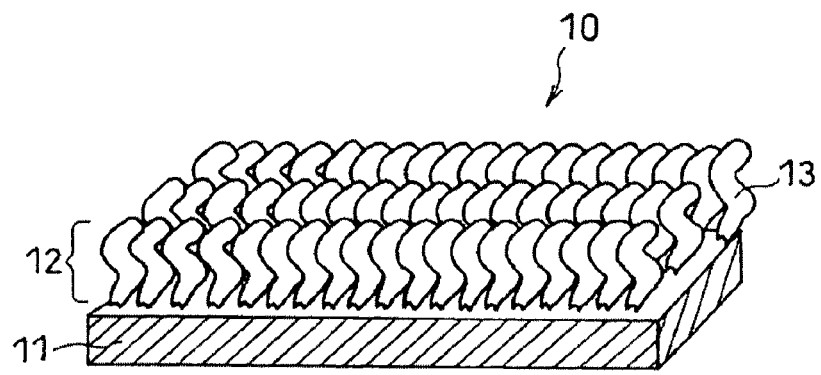
[FIG. 3] A perspective view conceptually illustrating an electrode for a lithium secondary battery according to one embodiment of the invention.

FIG. 3 is a perspective view conceptually illustrating an electrode 10 for a lithium secondary battery according to Embodiment 1 of the invention. The electrode 10 comprises a sheet-like current collector 11 and an active material layer 12 that is capable of absorbing and desorbing lithium and carried on the current collector. The active material layer 12 comprises a plurality of columnar particles having at least one bend. The columnar particles 13 grow continuously from the contacting portions (bottoms of the columnar particles) of the columnar particles 13 with the current collector 11, through the bend(s) and toward the surface of the active material layer.

Figure 4:
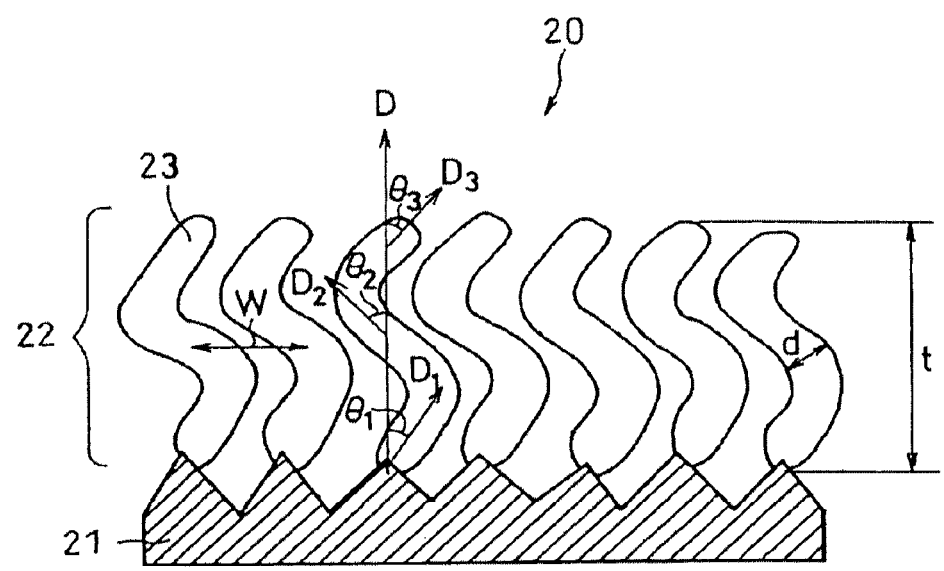
[FIG. 4] A magnified view of a part of the electrode for a lithium secondary battery according to one embodiment of the invention.

FIG. 4 is a magnified view of a part of an electrode for a lithium secondary battery. In FIG. 4, columnar particles 23 have two bends. A portion (first columnar portion) from a contacting portion (bottom of the columnar particles) of the columnar particles 23 with a current collector 21 to a first bend has a growth direction $D_1$. The growth direction $D_1$ forms an angle $\theta_1$ with the direction D normal to the surface of the current collector 21. $\theta_1$ is 10° or more and less than 90°. A portion (second columnar portion) from the first bend to a second bend has a growth direction $D_2$. The growth direction $D_2$ forms an angle $\theta_2$ with the direction D normal to the surface of the current collector. A portion (third columnar portion) from the second bend to a tip end of the columnar particles has a growth direction $D_3$. The growth direction $D_3$ forms an angle $\theta_3$ with the direction D normal to the surface of the current collector.

FIG. 5 shows an electron microscope photograph (SEM photograph) showing a part of an electrode including columnar particles having two bends. The result of observation shows that the active material layer is composed of columnar particles having two bends as shown in FIG. 4. The angle $\theta_1$ formed by a portion (first columnar portion) from a contacting portion of the columnar particles with the current collector to a first bend and the direction normal to the surface of the current collector is 45°; the angle $\theta_2$ formed by a portion (second columnar portion) from the first bend to a second bend and the direction normal to the surface of the current collector is also 45°; and the angle $\theta_3$ formed by a portion (third columnar portion) from the second bend to a third bend and the direction normal to the surface of the current collector is also 45°.

In the case where the columnar particles 23 include a negative electrode active material, the columnar particles 23 expand when lithium is absorbed therein. In the case where the columnar particles 23 include a positive electrode active material, the crystal lattice forming the particles is distorted in the c-axis direction and in either one direction or both directions of the (a, b)-axis directions when lithium is desorbed therefrom, and the columnar particles 23 slightly expand. In such cases, the expansion causes stress in the columnar particles 23. In a battery, since a positive electrode and a negative electrode are opposed to each other with a separator interposed therebetween, the stress in the thickness direction of the active material layer becomes particularly large. Although this stress is applied intensively to the interface between the active material and the current collector, if the columnar particles have a bend, the stress is dispersed at the bend in a plane direction. Accordingly, the stress applied to the bottoms of the columnar particles is relieved. As a result, the stress present in the interfaces between the columnar particles and the current collector is reduced, thus preventing a crack, if any, from advancing. Consequently, dropping of the active material caused by repeated charge and discharge cycles does not easily occur, and thus the deterioration in battery performance can be suppressed.

Although an explanation was given about the case where the number of columnar portions is three referring to FIG. 4, a general case where the number of columnar portion is increased will be hereinafter described. An angle $\theta_{1+1}$ (n is an integer of 1 or more) formed by a growth direction of a columnar portion from an n-th bend counted from a starting point of growth to an (n+1)-th bend and a direction normal to the current collector is generally 0° or more and less than 90°. Herein, a starting point of growth of columnar particles refers to a contacting portion of the columnar particles with the current collector (a bottom of the columnar particles). A growth direction of the columnar particles refers to a direction in which the columnar particles grow continuously from starting points of growth, through bends and toward the surface of the active material layer. In FIG. 4, the angle formed by a growth direction $D_2$ of the second columnar portion that is a region from a first bend to a second bend, and the direction D normal to the current collector corresponds to $\theta_2$.

In order to increase capacity, thickening an active material layer is required. In the invention, thickening an active material layer corresponds to growing columnar particles longer. In view of dispersing stress, it is desirable that a more number of bends be formed as the columnar particles are grown longer. For example, in the case of columnar particles having a height of 10 μm or more in the direction normal to the current collector, it is desirable that the columnar particles have at least one bend. In the case of columnar particles having a height of 50 μm or more in the direction normal to the current collector, it is desirable that the columnar particles have at least two or more bends. Further, in view of facilitating the formation of a porosity P, it is desirable that columnar particles having a height of 20 μm to 30 μm in the direction normal to the current collector have 4 or more and 10 or less bends.

It is not necessary that growth directions of each columnar portion (in FIG. 4, $D_1$ to $D_3$) be present in a same plane. When seen from the direction normal to the current collector, each columnar portion may be bent in different directions. In the case where the columnar particles have a plurality of bends, it is desirable that the columnar particles have a zigzag shape. According to the zigzag shape, one directional stress that might be applied intensively to the contacting portions of the columnar particles with the current collector can be dispersed in different directions, making it possible to relieve the stress efficiently. Moreover, in the case where the columnar particles have a zigzag shape, it is desirable that the columnar particles have a helical shape. According to the helical shape, stress applied to the contacting portions of the columnar particles with the current collector can be relieved more efficiently.

FIG. 6 shows an electrode for a lithium secondary battery according to another embodiment of the invention. An electrode 30 comprises a sheet-like current collector 31 and an active material layer 32 carried on the current collector. The active material layer 32 comprises a plurality of columnar particles 33 having at least one bend. A first columnar portion of the columnar particles 33 from a contacting portion thereof with the current collector 31 to a first bend has a growth direction $D_4$. The growth direction $D_4$ forms an angle $\theta_1$ with the direction D normal to the surface of the current collector 31. A second columnar portion from the first bend to a second bend has a growth direction $D_5$. The growth direction $D_5$ forms an angle $\theta_2$ with the direction D normal to the surface of the current collector. In this case also, it is not necessary that the growth directions $D_4$ to $D_5$ of each columnar portion be present in a same plane. Accordingly, when seen from the direction normal to the current collector, each columnar portion may be bent in different directions. Preferred ranges of the angles $\theta_1$ and $\theta_2$ formed by each columnar portion and the direction normal to the current collector are the same as in the case of the electrode 20 in FIG. 4.

Figure 7:
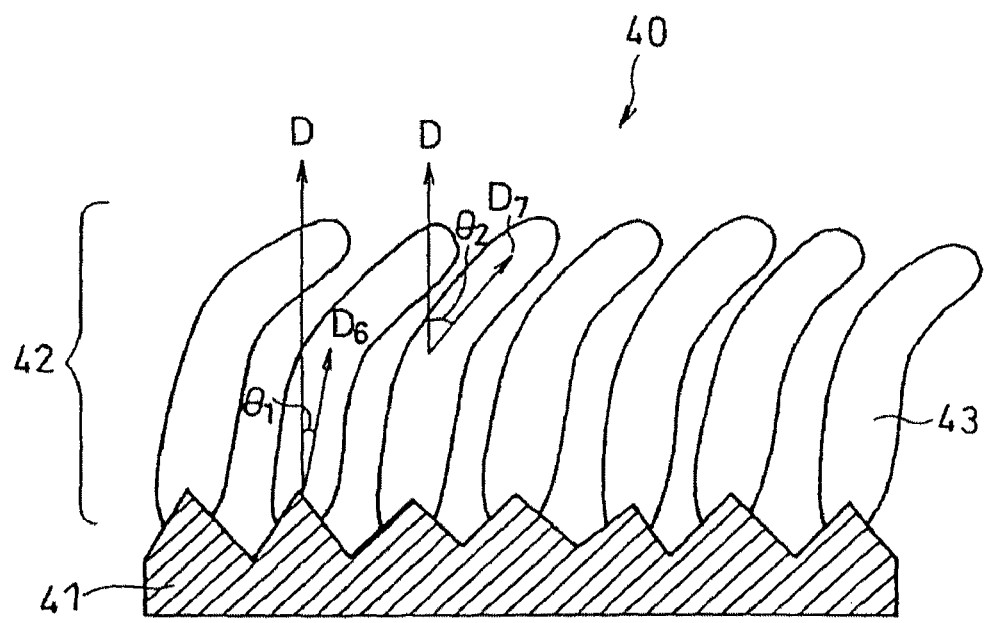
[FIG. 7] A magnified view of a part of an electrode for lithium secondary battery according to yet another embodiment of the invention.

FIG. 7 shows an electrode for a lithium secondary battery according to yet another embodiment of the invention. An electrode 40 comprises a sheet-like current collector 41 and an active material layer 42 carried on the current collector. The active material layer 42 comprises a plurality of columnar particles 43 having one bend. A first columnar portion of the columnar particles 43 from a contacting portion thereof with the current collector 41 to a first bend has a growth direction $D_6$. The growth direction $D_6$ forms an angle $\theta_1$ with the direction D normal to the surface of the current collector 41. A second columnar portion from the first bend to a second bend has a growth direction $D_7$. The growth direction $D_7$ forms an angle $\theta_2$ with the direction D normal to the surface of the current collector. In this case also, it is not necessary that the growth directions $D_6$ to $D_7$ of each columnar portion be present in a same plane. When seen from the normal direction, each columnar portion may be bent in different directions. Accordingly, preferred ranges of the angles $\theta_1$ and $\theta_2$ formed by each columnar portion and the direction normal to the current collector are the same as in the case of the electrode 20 in FIG. 4. It should be noted that the shape of the columnar particles is not limited by FIG. 3, FIG. 4, FIG. 6 and FIG. 7. No particular limitation is imposed on the shape of the columnar particles.

In view of securing a large contacting area between the electrolyte and the active material, and relieving the stress due to expansion of the active material, it is desirable that the active material layer has a predetermined porosity. The porosity P of the active material layer can be determined from the weight and thickness of the active material layer in a specific area and the true density of the active material. The porosity P can be measured more accurately by a gas absorption method or a method using a mercury intrusion type porosimeter.

Although the porosity P of an electrode is dependent on the degree of expansion of the active material when lithium is absorbed therein, it is approximately in a range of $10\% \leq P \leq 70\%$. When the porosity P is 10% or more, it is considered that the stress due to expansion and contraction of the columnar particles can be relieved sufficiently. Consequently, an abundant amount of electrolyte can be kept in contact with the columnar particles. In view of suppressing a reduction in capacity during quick charge and discharge, it is more desirable that the porosity P is $30\% \leq P \leq 60\%$. Even when the porosity P exceeds 70%, the electrode can be preferably used as an electrode depending on the application of the battery.

When the thickness of the active material layer (t in FIG. 4) is 0.1 µm or more, a sufficient energy density can be obtained; and when it is 100 µm or less, the possibility that each columnar particle might be shielded by other columnar particles can be suppressed. In addition, when the thickness of the active material layer is 100 µm or less, the resistance in current collection from the columnar particles can be suppressed, providing an advantage for high-rate charge and discharge. Therefore, the thickness of the active material layer is preferably 0.1 µm≦t≦100 µm. In view of suppressing elevation in temperature during quick charge and discharge, 1 µm≦t≦50 µm is particularly preferred.

No particular limitation is imposed on the shape of the cross section (hereinafter referred to as a cross section C) perpendicular to a growth direction of columnar particles. The shape of the cross section C may be different in the length direction of the columnar particles. However, in view of preventing the columnar particles from being cracked or separated from the current collector when the columnar particles expand, it is desirable that the cross section C is substantially circular. The diameter d of the cross section C is approximately 100 µm or less. In view of improvement in strength and reliability by making the particle fine, the diameter d of the cross section C is preferably 1 µm to 50 µm. In the case where the cross section C of the columnar particles is substantially circular, the diameter d can be determined, for example, as an average of the diameters of any 2 to 10 columnar particles. The diameter of a columnar particle is a diameter determined at the center height thereof. The center height means the center of height of the columnar particle in the direction normal to the current collector. The diameter d is a diameter perpendicular to a growth direction of the columnar particles.

A plurality of columnar particles adjacent to each other may be integrated during their growth. However, the individual columnar particles are separated near the surface of the current collector because they each have a different starting point of growth, and the particles grow differently from one another. For this reason, boundaries can be observed between the integrated individual columnar particles. Therefore, it is possible to determine a diameter d of individual columnar particles.

A preferred state of an active material at the time of measuring the porosity and thickness of the active material layer and the diameter of the columnar particles is dependent on whether the active material is a negative electrode active material or a positive electrode active material. In the case of a negative electrode active material, it is desirable that the measuring is carried out in a state where the active material contains lithium in an amount corresponding to an irreversible capacity and does not contain lithium in an amount corresponding to a reversible capacity (a state where the reversible capacity is zero), that is, in a fully discharged state. A fully discharged state corresponds to a state where the volume of the active material layer in a finished battery is minimum. On the other hand, in the case of a positive electrode active material, it is desirable that the measuring is carried out in a state immediately after the initial charge and discharge.

When the porosity of the negative electrode, the thickness of the active material layer and the diameter of the columnar particles are measured in a state where lithium is not contained in an amount corresponding to an irreversible capacity, a value in the case of a fully discharged state can be obtained by correcting the measured value. For example, the porosity P of an active material layer that does not contain lithium at all can be measured using a mercury porosimeter. In this case, the value of porosity P is corrected using a difference in volume $\Delta V$ between a volume of the active material layer containing lithium in an amount corresponding to an irreversible capacity in a fully discharged state, and a volume of the active material layer not containing lithium at all. A porosity P' in the case where lithium is contained in an amount corresponding to an irreversible capacity can be determined by $P'=P-\Delta V$.

In the case of a positive electrode active material, the porosity P' can be determined by $P'=P-\Delta V$ using a difference in volume $\Delta V$ between a volume V of the active material layer that has not been subjected to charge and discharge at all and a volume of the active material layer immediately after initial charge and discharge.

In the invention, any active material may be used as long as it is capable of forming columnar particles. However, it is preferable that the columnar particles contain an element that forms a compound or a solid solution with lithium. Examples of such an element include, for example, carbon, silicon, germanium, tin, indium, zinc and bismuth. These may be used singly or a plurality of these may be used in combination in an active material. Among these, silicon is particularly preferred.

The columnar particles may contain an oxide, a solid solution, a composite substance of these, a sulfide or the like of a transition metal element. For such a transition metal element, for example, at least one selected from the group consisting of elements of the fourth period, the fifth period and the sixth period in the periodic table may be used. Examples thereof include, for example, scandium, titanium, vanadium, chrome, manganese, iron, cobalt, nickel, copper, zinc, yttrium, zirconium, niobium, molybdenum, technetium, ruthenium, rhodium, palladium, silver, cadmium, a lanthanoid series element, hafnium, tantalum, tungsten, rhenium, osmium and iridium. These may be used singly or a plurality of these may be used in combination. Among these, at least one selected from the group consisting of Co, Ni and Mn is preferably used.

Examples of the negative electrode active material forming columnar particles include, for example, Si, Sn, Al, a Si alloy, a Sn alloy, an Al alloy, CoO, $SiO_x$ and $SnO_x$. However, in view of improvement in capacity of the negative electrode, it is particularly desirable that the columnar particles contain silicon element. For example, it is preferable that the columnar particles contain at least one selected from the group consisting of silicon simple substance, a silicon alloy, a silicon oxide and a silicon nitride. These may form an active material layer singly or a plurality of these may form an active material layer at the same time. The silicon nitride may further contain oxygen. An active material layer formed by a plurality of these is exemplified by an active material layer composed of a compound containing silicon, oxygen and nitrogen. It is also exemplified by an active material layer composed of a composite substance of a plurality of silicon oxides having different ratios of silicon to oxygen. It is desirable that the silicon oxide has a composition represented by the general formula (I): $SiO_x$ (where $0<x<2$). In view of practical use, it is more preferable that a value x representing a content of oxygen element is $0.01 \leq x \leq 1$.

For the positive electrode active material forming columnar particles, for example, a lithium-containing transition metal oxide such as $LiCoO_2$, $LiNiO_2$, $LiMn_2O_4$, $LiNi_xCo_{1-x}O_2$ or $LiNi_xCo_yMn_zO_2$ (where $0 \leq x<1$, $0$; $y<1$, $0 \leq z<1$ and $x+y+z=1$) or a metal oxide not containing lithium such as $MnO_2$ is preferred. In view of improvement in capacity and practical use, a lithium-containing composite oxide such as $LiNi_xCo_{1-x}O_2$ is particularly desired.

The columnar particle may be a monocrystal particle of active material or a polycrystalline particle containing a plurality of crystallites (crystal grains) of active material. The columnar particle may be a particle containing fine crystals of active material having a crystallite size of 100 nm or less, or a particle containing a uniform amorphous active material.

In the invention, no limitation is imposed on the material of the sheet-like current collector. For the negative electrode current collector, copper is generally suitable, and for example, an electrolytic copper alloy foil or an electrolytic copper foil is used. An electrolytic copper foil with roughened surface, a rolled copper foil with roughened surface or the like is also used. Titanium, nickel, stainless steel or the like is also suitable as the current collector. It is preferable that the current collector is fabricated by an electrolytic method. For the positive electrode current collector, Al, an Al alloy, Ni, Ti or the like is suitable. Although no particular limitation is imposed on the thickness of each current collector, for example, a typical thickness is 1 to 50 μm.

It is desirable that the surface of the sheet-like current collector on which the active material layer is carried is made rough. Specifically, for a value of surface roughness Rz (ten point average height) of the current collector, preferred is a range of 0.1 to 50 μm, and more preferred is 0.3 to 30 μm. When the surface roughness Rz is less than 0.1 μm, it may be difficult to provide a gap between the columnar particles adjacent to each other. The surface roughness Rz is specified in Japanese Industrial Standard (JISB 0601-1994) and, for example, can be measured by a commercially available surface roughness meter.

Figure 8B:
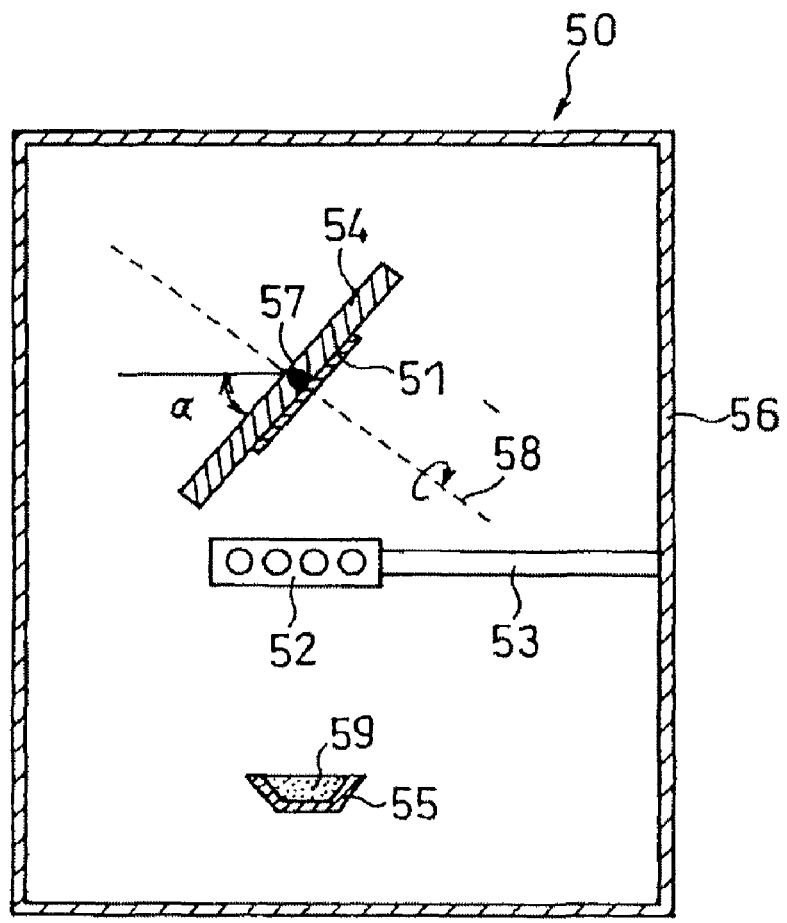
[FIG. 8B] A cross sectional view of section B-B of FIG. 8A.

The electrode for a lithium secondary battery of the invention may be fabricated, for example, using a production apparatus 50 as shown in FIG. 8A and FIG. 8B. FIG. 8B is a cross sectional view of section B-B of FIG. 8A. The production apparatus 50 comprises a chamber 56 for realizing a vacuum atmosphere, a fixing table 54 for fixing a current collector 51, a target 55 containing a material supplying source 59 and an electron beam (not shown) serving as a means for heating the target.

In the case of forming an active material layer containing an oxide or a nitride, an oxide or a nitride may be used as the material supplying source, or alternatively, a gas introduction part for introducing gas to the interior of the chamber may be disposed. The production apparatus 50 is provided with a nozzle 52 for emitting gas and a piping 53 for introducing gas to the nozzle 52 from the outside. For example, in the case of depositing an active material containing a silicon oxide in a columnar state, for the material supplying source, SiO may be used, or alternatively, silicon simple substance may be used while high purity oxygen gas is emitted from the nozzle 52. It is preferable that the degree of vacuum in the chamber is adjusted to approximately 1 Pa.

In the case where silicon simple substance is used as the material supplying source, irradiation of an electron beam to the silicon simple substance heats and vaporizes silicon. The vaporized silicon is passed through oxygen atmosphere and deposited on the surface of the current collector as a silicon oxide. In the case where tin is used in place of silicon, it is possible to deposit a tin oxide on the surface of the current collector. In the case of using a target containing Li and a target containing Co and optimizing the evaporation rate of each target appropriately, it is possible to deposit $LiCoO_2$ on the surface of the current collector.

The electrode of the invention is fabricated, for example, in the following procedures.

After the current collector 51 is fixed on the fixing table 54, the fixing table 54 is rotated about a rotation axis 57 to place the fixing table 54 such that it forms an angle a with the horizontal plane. The rotation axis 57 is an axis being in parallel with the fixing table 54 and the horizontal plane, and passing through the center C of the fixing table 54. The horizontal plane is a plane perpendicular to a flow direction of a vapor of material supplying source directed from the target 55 to the fixing table 54. Deposition of active material is carried out while the fixing table 54 is fixed at the angle a. Next, the fixing table 54 is rotated by 180 degrees clockwise about a rotation axis 58 and then fixed. The rotation axis 58 is an axis being perpendicular to the surface of the current collector, and passing through the center C of the fixing table 54. Further deposition of active material is carried out in this state. The fixing table 54 is then rotated by 180 degrees clockwise about the rotation axis 58 and then fixed to resume deposition of active material. As a result of such procedures, columnar particles having two bends as shown in FIG. 4 can be obtained. The angle formed by a first columnar portion or a second columnar portion of the columnar particles and a direction normal to the surface of the current collector is controlled by adjusting the angle a formed by the fixing table 54 and the horizontal plane.

In order to form the columnar particles in a helical shape, an apparatus in which the fixing table 54 is rotated about the rotation axis 58 is used. First, after the current collector is fixed on the fixing table 54, the fixing table 54 is rotated about the rotation axis 57 to place the fixing table 54 such that it forms an angle a with the horizontal plane. Subsequently, the current collector 51 is rotated about the rotation axis 58 during deposition of active material. During the deposition of active material, the angle a formed by the fixing table 54 and the horizontal plane is kept constant. In doing this, by rotating the current collector 51 at a speed proportional to the deposition speed of active material, columnar particles having a helical shape can be obtained.

Figure 9:
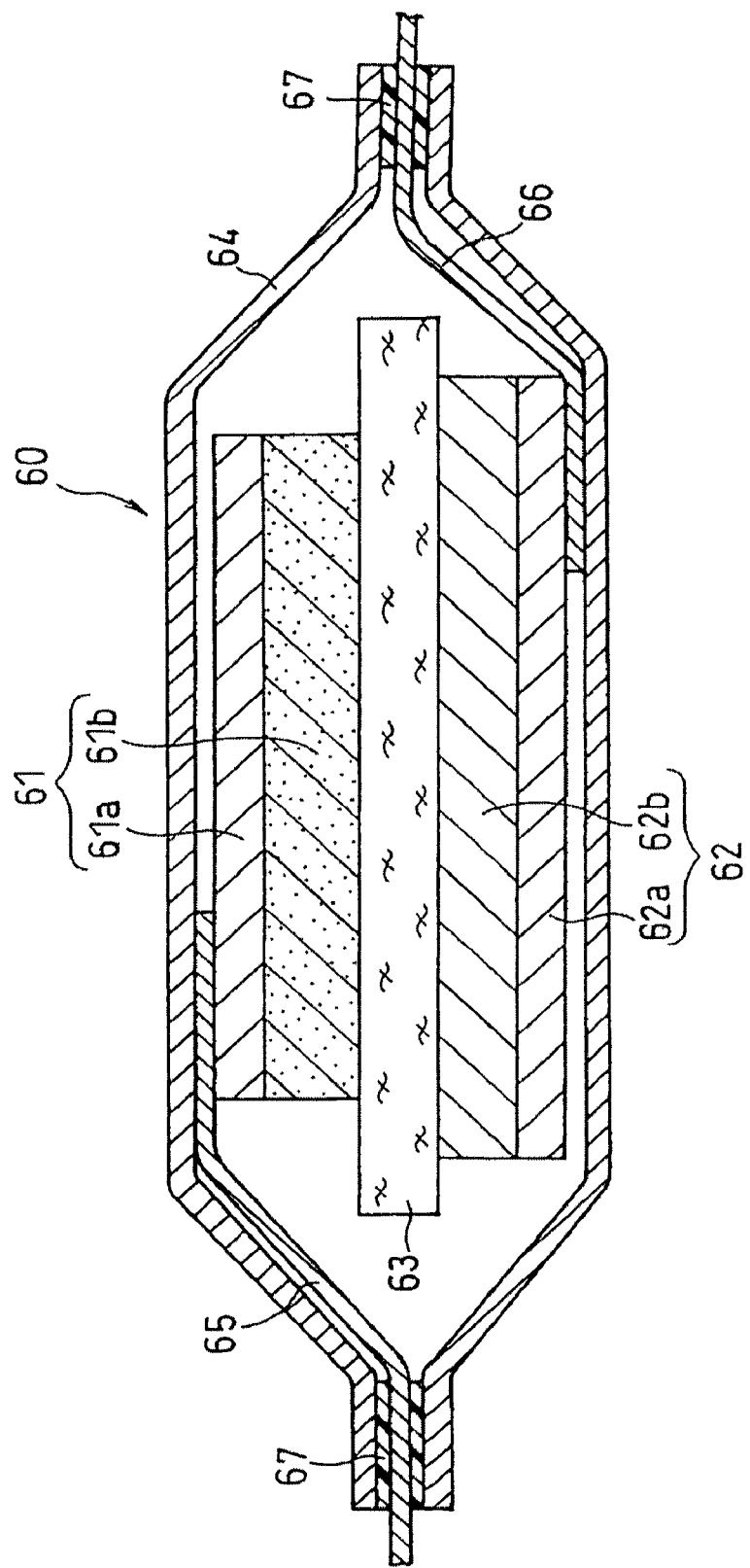
[FIG. 9] A longitudinal cross sectional view illustrating one example of a layered lithium secondary battery.

FIG. 9 is a schematic cross sectional view of a layered lithium secondary battery as one example of a lithium secondary battery of the invention. A battery 60 comprises an electrode assembly including a positive electrode 61, a negative electrode 62 and a separator 63 interposed therebetween. The electrode assembly and an electrolyte having lithium ion conductivity are housed in the interior of an outer case 64. The separator 63 is impregnated with the electrolyte having lithium ion conductivity. The positive electrode 61 is composed of a positive electrode current collector 61a and a positive electrode active material layer 61b carried on the positive electrode current collector 61a; and the negative electrode 62 is composed of a negative electrode current collector 62a and a negative electrode active material layer 62b carried on the negative electrode current collector 62a.

One end of a positive electrode lead 65 and one end of a negative electrode lead 66 are connected to the positive electrode current collector 61a and the negative electrode current collector 62a, respectively; and the other ends are guided to the outside of the outer case 64. The opening of the outer case 64 is sealed by a resin material 67.

The positive electrode active material layer 61b desorbs lithium ions during charge, and during discharge, absorbs lithium ions desorbed from the negative electrode active material layer 62b. The negative electrode active material layer 62b absorbs the lithium ions desorbed by the positive electrode active material during charge, and desorbs lithium ions during discharge.

In a layered battery, 3 layers or more including a positive electrode and a negative electrode may be laminated. In this case, a positive electrode having a positive electrode active material layer on both faces or one face thereof, and a negative electrode having a negative electrode active material layer on both faces or one face thereof are to be used. In this case, every positive electrode active material layer must be opposed to the negative electrode active material layer and every negative electrode active material layer must be opposed to the positive electrode active material layer.

The slanted states of the individual regions defined by bends (each columnar portion) of the columnar particles may be the same in all active material layers or different in every active material layer. Moreover, columnar particles being different in slanted state of each columnar portion may be included in one electrode. In the case where the electrode has an active material layer on both faces thereof, in the columnar particles on both faces, the slanted states of each columnar portion may be the same or different.

For the electrolyte having lithium ion conductivity to be used in the invention, various solid electrolytes and non-aqueous electrolytes may be used. Among the non-aqueous electrolytes, one with a lithium salt dissolved in a non-aqueous solvent is preferably used. No particular limitation is imposed on the composition of the non-aqueous electrolyte. No particular limitation is imposed also on the separator and the outer case, and the materials used in various forms of lithium secondary batteries may be used without particular limitation.

Although in FIG. 9, one example of a layered battery is shown, the invention is applicable, as a matter of course, to a cylindrical battery or a prismatic battery having a spiral (wound) electrode assembly.

Figure 10A:
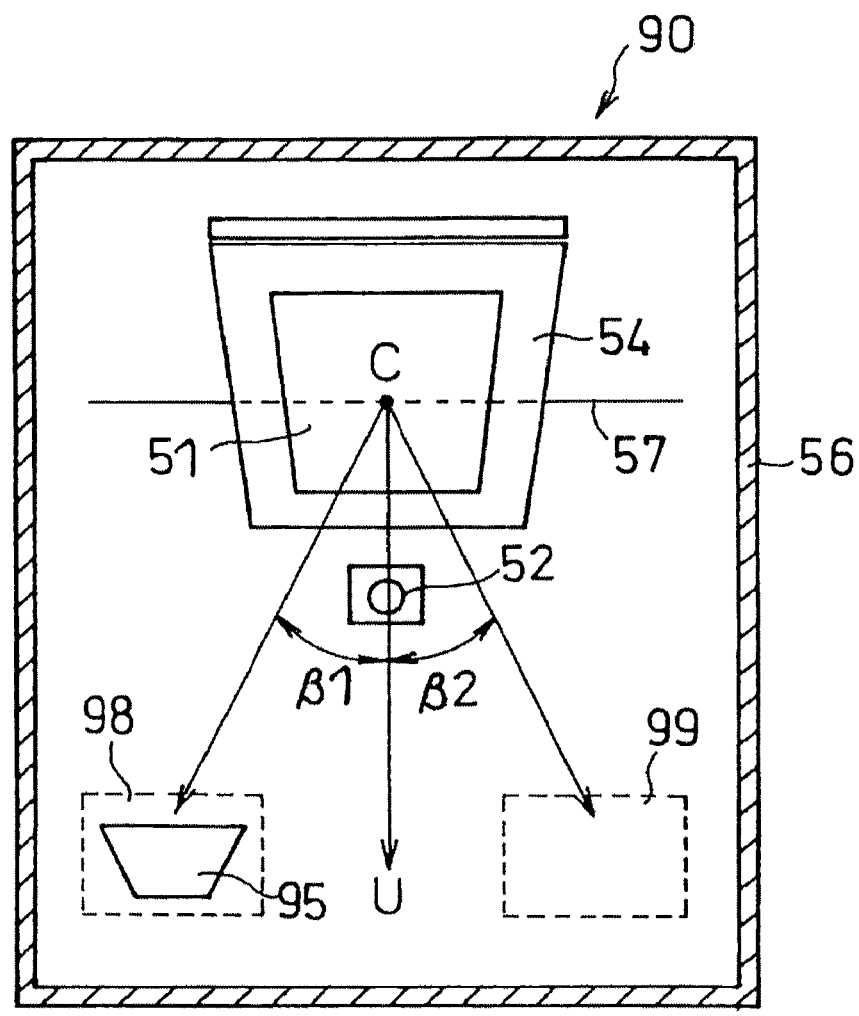
[FIG. 10A] A schematic view illustrating another example of a production apparatus for an electrode for a lithium secondary battery.
Figure 10B:
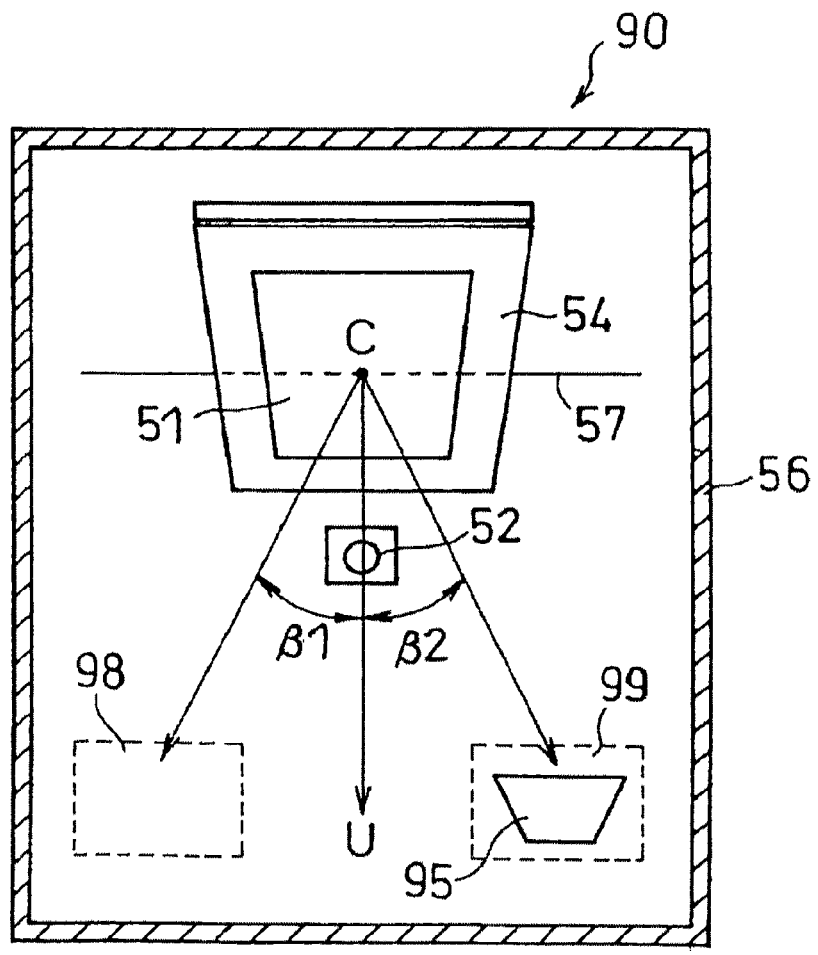
[FIG. 10B] A schematic view illustrating another state of the production apparatus in FIG. 10A.

FIG. 10A and FIG. 10B show another production apparatus for an electrode for a lithium secondary battery of the invention. A production apparatus 90 is configured in the same manner as in the case of the production apparatus 50 shown in FIG. 8A and FIG. 8B except the placed position of a target 95 containing a material supplying source and an electron beam device (not shown) serving as a means for heating the target. Therefore, the fixing table 54 is rotatable about the rotation axis 57 such that it forms an angle a with the horizontal plane. The placed position of the target 95 can be moved between a first position 98 and a second position 99. The first position 98 and the second position 99 are symmetric to each other with respect to the plane passing through the center C of the fixing table 54 and being orthogonal to the rotation axis 57.

The angle β1 formed by the vertically downward direction U from the center C of the fixing table 54 and a direction from the center C to a first position can be set within a range of 0° or more and less than 90°. Similarly, the angle β2 formed by the direction U and a direction from the center C to a second position can be set within a range of 0° or more and less than 90°. In the case where the fixing table 54 forms an angle a with the horizontal plane, the angles β1 and β2 are preferably in ranges of a×0.2≦β1≦a×0.8 and a×0.2≦β2≦a×0.8, respectively, and more preferably in the ranges a×0.35≦β1≦a×0.65 and a×0.35≦β2≦a×0.65.

FIG. 10A shows a state in which the target 95 is present in the first position. FIG. 10B shows a state in which the target 95 is present in the second position. The target 95 is moved alternately between the first position 98 and the second position 99 to allow the material supplying source to evaporate alternately at the first position 98 and the second position 99. As a result, the incident direction of a vapor of material supplying source from the first position to the current collector and the incident direction from the second position to the current collector are each slanted toward the axis direction of the rotation axis 57 with respect to the direction normal to the current collector. The angle a formed by the fixing table 54 and the horizontal plane may be set, for example, within the range of 0≦a<90°. The angle a may be 0°.

When the angle a formed by the fixing table 54 and the horizontal plane is greater than 0°, the columnar particles are slanted toward the direction opposite to the rotating direction of the rotation axis 57 with respect to the direction normal to the current collector. Moreover, the columnar particles are slanted toward the axis direction of the rotation axis 57 when the incident direction of a vapor of material supplying source to the current collector forms angles β1 and β2 with the direction U.

By depositing the active material on the current collector in such a manner as described above, the incident direction of a vapor of material supplying source can be variously changed. Therefore, it is possible to readily grow columnar particles having a bend. Moreover, by virtue of a shadowing effect due to the protrusions on the surface of the current collector, gaps can be created effectively between the adjacent columnar particles. As a result, expansion stress of the active material during charge can be effectively dispersed. Further, the foregoing method is convenient in that it is possible to grow columnar particles having a bend simply by controlling the position of the target even when the position of the fixing table 54 is unchanged.

Figure 11B:
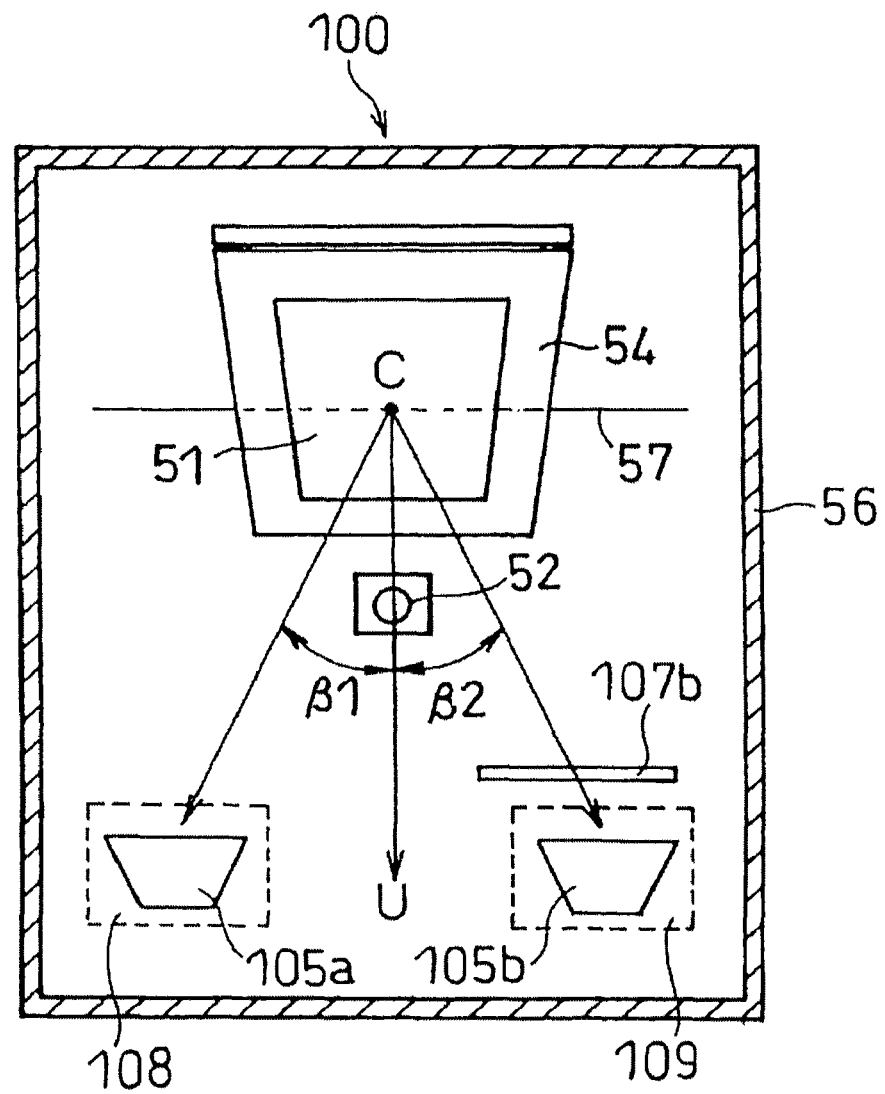
[FIG. 11B] A schematic view illustrating another state of the production apparatus in FIG. 11A.

FIG. 11A and FIG. 11B show yet another production apparatus for an electrode for a lithium secondary battery of the invention. A production apparatus 100 is configured in the same manner as in the case of the production apparatus 50 shown in FIG. 8A and FIG. 8B except the placed position of a target containing a material supplying source and an electron beam device (not shown) serving as a means for heating the target. The production apparatus 100 has two targets 105a and 105b. The placed positions of the targets 105a and 105b are a first position 108 and a second position 109, respectively. The first position 108 and the second position 109 are symmetric to each other with respect to the plane passing through the center C of the fixing table 54 and being orthogonal to the rotation axis 57. The angle β1 (or angle β2) formed by the vertically downward direction U from the center C of the fixing table 54 and a direction from the center C to a first position (or a second position) is similar to that in the production apparatus 90 in FIG. 10A and FIG. 10B.

The targets 105a and 105b can be separately shielded by a shutter 107a and a shutter 107b, respectively. FIG. 11A conceptually shows a state in which the target 105a is shielded by the shutter 107a. FIG. 11B conceptually shows a state in which the target 105b is shielded by the shutter 107b. Only one shutter that is movable between the first position 108 and the second position 109 may be placed. The targets 105a and 105b are alternately shielded by the shutter 107a and the shutter 107b, thereby allowing the material supplying source to evaporate from the unshielded target. According to such a method, columnar particles having a bend can be formed as in the case of using the production apparatus 90.

Figure 12:
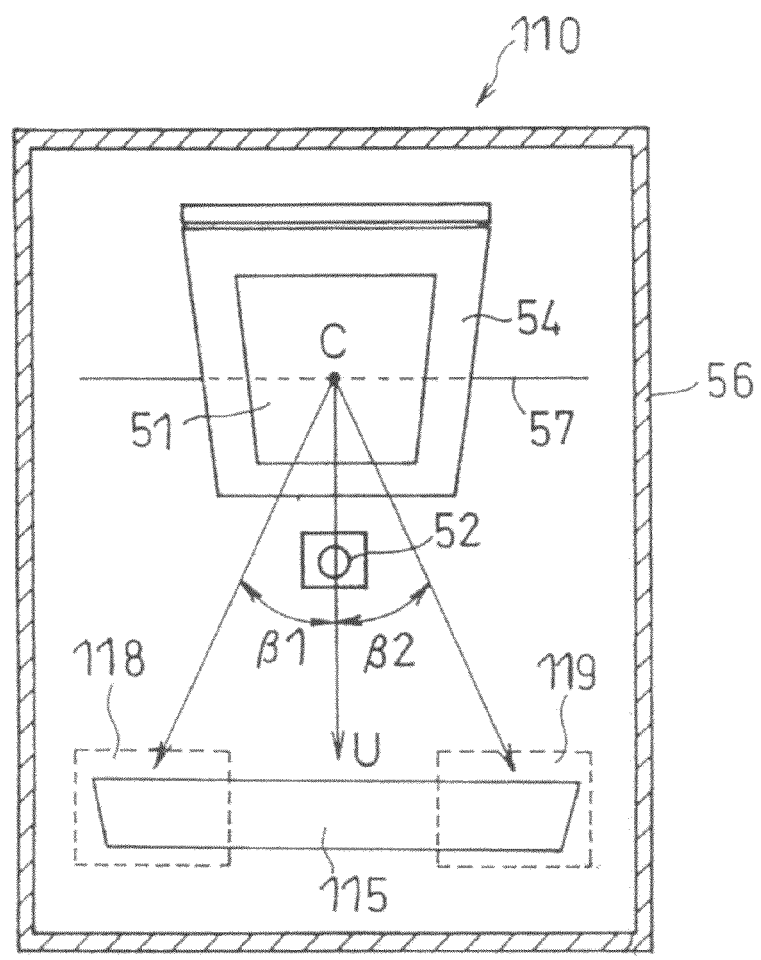
[FIG. 12] A schematic view illustrating still another example of a production apparatus for an electrode for a lithium secondary battery.

FIG. 12 shows still another production apparatus for an electrode for a lithium secondary battery of the invention. A production apparatus 110 is configured in the same manner as in the case of the production apparatus 50 shown in FIG. 8A and FIG. 8B except a target containing a material supplying source. Specifically, a first position 118 and a second position 119 are symmetric to each other with respect to the plane passing through the center C of the fixing table 54 and being orthogonal to the rotation axis 57. The angle β1 (or angle β2) formed by the vertically downward direction U from the center C of the fixing table 54 and a direction from the center C to the first position (or the second position) is similar to that in the production apparatus 90 in FIG. 10A and FIG. 10B.

The target 115 has a width covering from the first position 118 to the second position 119. One end of the target 115 corresponds to the first position 118, and the other end thereof corresponds to the second position 119. By changing the irradiation position of an electron beam, a part or the whole of the target 115 can be heated. The irradiation position of an electron beam is controlled to allow the material supplying source to evaporate alternately at the first position and the second position. According to such a method, columnar particles having a bend can be formed as in the case of using the production apparatus 90.

In the production apparatus 110 in FIG. 12, if one electron beam device is placed at the first position 118 and another placed at the second position 119 and an electron beam is irradiated alternately toward the first position 118 and the second position 119, a similar effect can be achieved.

If the material supplying source is fixed and the fixing table for fixing a current collector is rotated or slanted in biaxial directions, a similar effect can be achieved. However, in the case where a continuous length of current collector is wound out of a roll to continuously fabricate an electrode, and then wound up into a roll, it is difficult to change the slanted angle of the current collector variously during the process of producing of the electrode. In contrast, in the case of the production apparatuses as shown in FIGS. 10 to 12, the slanted angle of the current collector can be readily changed variously simply by controlling the placed position of a material supplying source or evaporation timing.

In the following, the invention will be described in detail with reference to Examples, but the invention is not limited to the following Examples.

EXAMPLE 1

A layered lithium secondary battery as shown in FIG. 9 was fabricated.
(i) Fabrication of Positive Electrode 10 g of lithium cobalt oxide ($LiCoO_2$) powder having a mean particle size of 10 μm as a positive electrode active material, 0.3 g of acetylene black as a conductive material, 0.8 g of polyvinylidene fluoride powder as a binder and an appropriate amount of N-methyl-2-pyrrolidone (NMP) were mixed sufficiently, whereby a positive electrode material mixture paste was prepared.

The resultant paste was applied on one face of the positive electrode current collector 61a made of a 20 μm thick aluminum foil and dried, and then rolled to form the positive electrode active material layer 61b. Thereafter, a positive electrode was cut out in a predetermined shape. In the resultant positive electrode, the positive electrode active material layer carried on one face of the aluminum foil had a thickness of 70 μm and a size of 30 mm×30 mm. A lead was connected with the back face of the current collector, the face not having the positive electrode active material layer.
(ii) Fabrication of Negative Electrode The production apparatus 50 (available from ULVAC CORPORATION) comprising an electron beam heating means (not shown) as shown in FIG. 8A and FIG. 8b was used to fabricate a negative electrode. The production apparatus 50 is provided with the nozzle 52 for introducing oxygen gas to the interior of the chamber 56. The nozzle 52 was connected with the piping 53 guided to the interior of the chamber 56. The piping 53 was connected with an oxygen cylinder via a massflow controller. The fixing table 54 for fixing the negative electrode current collector 51 (62a in FIG. 9) was placed above the nozzle 52. The target 55 was placed vertically below the fixing table 54. The target 55 was charged with silicon simple substance having a purity of 99.9999% (available from Kojundo Chemical Laboratory Co., Ltd.) as the material supplying source 59.

For the negative electrode current collector, an electrolytic copper foil (available from Furukawa Circuit Foil Co., Ltd.) having a thickness of 35 μm, a cut out size of 40 mm×40 mm and a surface roughness Rz of 5 μm was used. The fixing table 54 on which the negative electrode current collector was fixed was first slanted so that an angle a of 63° was formed with the horizontal plane, and in this state, an active material was vapor deposited for 15 minutes (first vapor deposition process). Thereafter, the fixing table 54 was rotated by 180° clockwise about the rotation axis 58, and in this state, the active material was further vapor deposited for 15 minutes (second vapor deposition process).

The accelerating voltage of the electron beam irradiated to the target 55 was set at −8 kV, and the emission thereof was set at 500 mA. A vapor of elementary silicon was deposited together with oxygen in the chamber on the negative electrode current collector placed on the fixing table 54, whereby a negative electrode active material layer composed of a silicon oxide was formed. A negative electrode thus obtained was referred to as Negative electrode 1A. Thereafter Negative electrode 1A was cut in a size of 31 mm×31 mm. A lead terminal was connected with the back face of the current collector, the face not having the negative electrode active material layer.

Figure 13:
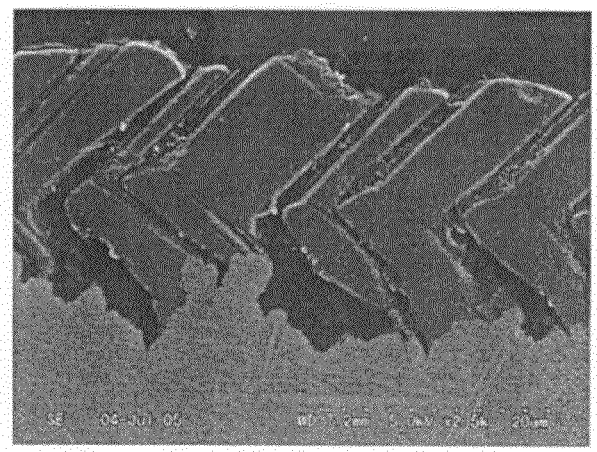
[FIG. 13] A SEM photograph of a cross section parallel to columnar particles of a negative electrode according to Example.

The amount of oxygen contained in the resultant negative electrode active material layer was quantified by a combustion method. The result showed that the composition of the silicon oxide was $SiO_{0.1}$. Subsequently, the cross section of Negative electrode 1A was observed from various angles with an electron microscope (SEM). FIG. 13 shows a SEM photograph of the cross section of the columnar particles of Negative electrode 1A parallel to their growth direction.

From the result of observation, it was found that the negative electrode active material layer was composed of columnar particles having one bend as shown in FIG. 13. The angle $\theta_1$ formed by a first columnar portion of the columnar particles from a contacting portion thereof with the current collector to the bend and a direction normal to the surface of the current collector was 45°; the angle $\theta_2$ formed by a second columnar portion from the bend to a tip end of the columnar particles was also 45°. The thickness t of the negative electrode active material layer was 20 μm, and the center to center distance (pitch) between the columnar particles adjacent to each other was 9 μm. The diameter of the columnar particles at the center height was 5 μm.

Next, the porosity P of Negative electrode 1A was measured using a mercury porosimeter (Autopore III 9410 available from Shimadzu Corporation) in the following manner.

On one face of a copper foil having a size of 3 cm×3 cm (surface roughness: Rz=10 μm, and thickness: 35 μm), columnar particles of $SiO_{0.1}$ were formed uniformly under the same conditions as above, whereby a sample of Negative electrode 1A was fabricated. From the weight of the resultant sample, the weight of the copper foil was subtracted to determine a weight of the active material layer; and from the density of $SiO_{0.1}$, a true volume (VT) of the active material layer was determined. Subsequently, mercury was allowed to intrude into the pores of the sample, and a volume (VH) of the mercury intruded was determined. From the true volume (VT) of the active material layer and the volume (VH) of the mercury intruded into the pores of the sample, a porosity P was determined. The porosity P was 31%.

Physical properties of Negative electrode 1A are summarized below.

Composition of active material: $SiO_{0.1}$

Angle θ1 formed by first columnar portion and direction normal to current collector surface: 45°

Angle θ2 formed by second columnar portion and direction normal to current collector surface: 45°

Thickness of active material layer: 20 μm

Center to center distance of columnar particles adjacent to each other: 9 μm

Diameter of columnar particles: 5 μm

Surface roughness Rz of current collector: 10 μm

Porosity P: 31%

(iii) Fabrication of Test Battery

A positive electrode active material layer and a negative electrode active material layer were opposed to each other with a separator made of a 20 μm thick polyethylene microporous film available from Asahi Kasei Corporation interposed therebetween, whereby a thin electrode assembly was formed. This electrode assembly was inserted into an outer case made of aluminum laminate sheet together with an electrolyte. For the electrolyte, a non-aqueous electrolyte obtained by mixing ethylene carbonate (EC) and ethyl methyl carbonate (EMC) in a volume ratio of 1:1 and dissolving $LiPF_6$ thereto at a concentration of 1.0 mol/L was used. The non-aqueous electrolyte was impregnated into the positive electrode active material layer, the negative electrode active material layer and the separator. Thereafter, in a state where a positive electrode lead and a negative electrode lead are guided to the outside, the end portions of the outer case 64 were welded while the pressure was reduced to vacuum, whereby a test battery was finished. The resultant test battery was referred to as Battery 1A.

COMPARATIVE EXAMPLE 1

A negative electrode was fabricated in the following manner.

For the negative electrode current collector, an electrolytic copper foil (available from Furukawa Circuit Foil Co., Ltd.) having a thickness of 35 μm and a surface roughness Rz of 10 μm was used. On this copper foil, a dry film resist available from Hitachi Chemical Co., Ltd. was laminated. A photo mask with a 30 μm diameter dot pattern arranged at an interval of 10 μm was used to expose the dry resist film on the copper foil to light, and then the dry resist film was developed with an aqueous $NaHCO_3$ solution. Thereafter the copper foil was washed with water and dried, and then vapor deposition was carried out using a production apparatus as shown in FIG. 8A and FIG. 8B.

The copper foil having the resist with 30 μm diameter holes arranged at an interval of 10 μm was fixed on the fixing table 54. The angle a formed by the fixing table and the horizontal plane was adjusted to 0° to horizontally place the copper foil. The accelerating voltage of an electron beam irradiated to the target 55 of silicon simple substance was set at −8 kV, and the emission thereof was set at 500 mA. A vapor of elementary silicon was vapor deposited together with oxygen in the chamber on the copper foil placed on the fixing table 54, whereby an active material layer composed of a silicon oxide was formed. The deposition time was set to 40 minutes. Thereafter, the copper foil carrying the active material layer was immersed in an aqueous sodium hydroxide solution to remove the resist and a thin film of the silicon oxide attached on the resist. A negative electrode thus obtained was referred to as Negative electrode 1B.

The amount of oxygen contained in the resultant active material layer was quantified by a combustion method. The result showed that the composition of the silicon oxide was $SiO_{0.1}$. Subsequently, the cross section of Negative electrode 1B was observed with an electron microscope. The result showed that the active material formed columnar particles. The angle θ formed by the columnar particles and the direction normal to the copper foil was 0° (i.e., perpendicular to the copper foil surface). The thickness t of the active material layer was 21.5 μm, and the center to center distance (pitch) between the columnar particles adjacent to each other was 40 μm at the center height of columnar particle. The diameter of the columnar particles at the center height was 30 μm. The porosity P of Negative electrode 1B determined using a mercury porosimeter was 49%.

Physical properties of Negative electrode 1B are summarized below.

Composition of active material: $SiO_{0.1}$

Angle θ formed by columnar particles and direction normal to current collector: 0°

Thickness of active material layer: 21.5 μm

Center to center distance of columnar particles adjacent to each other: 40 μm

Diameter of columnar particles: 30 μm

Porosity P: 49%

Test battery 1B was fabricated in the same manner as in Example 1 except that the negative electrode thus obtained was used.

Evaluation Method 1

Batteries 1A and 1B were each housed in a thermostatic chamber at 20° C. and subjected to charge in a constant current and constant voltage system. In this evaluation, a constant current charge was carried out at 1 C rate (1 C is a value of current at which the whole battery capacity can be consumed in one hour) until the battery voltage reached 4.2 V, and after 4.2V was reached, a constant voltage charge was carried out until the current value reached 0.05 C. After charged, the batteries were allowed to stand for 20 minutes. Thereafter, a constant current discharge was carried out at a high-rate of 1 C until the battery voltage reached 2.5 V. After the high-rate discharge, redischarge was carried out at a constant current of 0.2 C until the battery voltage reached 2.5 V. After the redischarge, the batteries were allowed to stand for 20 minutes.

The foregoing charge and discharge was repeated to the total of 100 cycles. (i) In the initial cycle, the proportion of a whole discharge capacity (total of high-rate discharge and redischarge) relative to a charge capacity was determined as a percentage as a charge and discharge efficiency. Further, (ii) in the initial cycle, the proportion of a discharge capacity in the high-rate discharge relative to a whole discharge capacity was determined as a percentage as a high-rate ratio. (iii) Furthermore, the proportion of a whole discharge capacity at the 100th cycle relative to a whole discharge capacity in the initial cycle was determined as a percentage as a capacity retention rate. The results are shown in Table 1.

TABLE 1

|  | Charge and discharge efficiency | High-rate ratio | Capacity retention rate |
|---|---|---|---|
| Battery 1A | 99.9% | 91% | 93% |
| Battery 1B | 99.3% | 81% | 61% |

Table 1 shows that, compared with Battery 1B, Battery 1A has a considerably improved capacity retention rate, as well as a high charge and discharge efficiency and a high high-rate ratio. It is considered that the capacity retention rate was considerably improved because the columnar particles had a bend, and thus the stress was relieved at the contacting portions between the negative electrode active material and the current collector. Further, it is considered that the charge and discharge efficiency and the high-rate ratio in the initial cycle were high because the columnar particles are slanted with respect to the current collector, and thus the contacting area between the negative electrode active material and the electrolyte was increased. As the opposing portion of the negative electrode active material and the positive electrode active material is increased, the charge and discharge reaction occurs more uniformly. It is considered that for this reason, the lithium precipitation reaction and the localized overcharge or overdischarge of the positive electrode were suppressed.

EXAMPLE 2

<i> Negative Electrode 2A

A negative electrode active material layer including columnar particles having two bends and having first, second and third columnar portions as shown in FIG. 4 was formed, whereby Negative electrode 2A was obtained. In the columnar particles of Negative electrode 2A, $\theta_1$, $\theta_2$ and $\theta_3$ were controlled to 45°, 45° and 45°, respectively. For the current collector, an electrolytic copper foil having a surface roughness Rz of 10 μm was used. The fixing table 54 was first slanted such that an angle a of 63° was formed with the horizontal plane, and in this state, an active material was vapor deposited for 10 minutes (first vapor deposition process). Thereafter, the fixing table 54 was rotated by 180° clockwise about the rotation axis 58, and in this state, the active material was vapor deposited for 10 minutes (second vapor deposition process). Thereafter, the fixing table 54 was further rotated by 180° clockwise about the rotation axis 58, and in this state, the active material was vapor deposited for 10 minutes (third vapor deposition process). A negative electrode was fabricated in the same manner as in Example 1 except the above.

Physical properties of Negative electrode 2A are summarized below.
  Composition of active material: $SiO_{0.1}$
  Angle $\theta1$ formed by first columnar portion and direction normal to current collector surface: 45°
  Angle $\theta2$ (direction opposite to $\theta1$) formed by second columnar portion and direction normal to current collector surface: 45°
  Angle $\theta3$ (direction identical with $\theta1$) formed by third columnar portion and direction normal to current collector surface: 45°
  Thickness of active material layer: 17.5 μm
  Center to center distance of columnar particles adjacent to each other: 10 μm
  Diameter of columnar particles: 5 μm
  Surface roughness Rz of current collector: 10 μm
  Porosity P: 30%<

<ii> Negative Electrode 2B

A negative electrode active material layer including columnar particles having first and second columnar portions as shown in FIG. 7 was formed, whereby Negative electrode 2B was obtained. In the columnar particles of Negative electrode 2B, $\theta_1$ and $\theta_2$ were controlled to 45° and 60°, respectively. For the current collector, an electrolytic copper foil having a surface roughness Rz of 10 μm was used. The fixing table 54 was first slanted such that an angle a of 63° was formed with the horizontal plane, and in this state, an active material was vapor deposited for 15 minutes (first vapor deposition process). Thereafter, the fixing table 54 was not reversed but slanted such that an angle of 74° was formed with the horizontal plane, and in this state, the active material was vapor deposited for 21 minutes (second vapor deposition process). A negative electrode was fabricated in the same manner as in Example 1 except the above.

Physical properties of Negative electrode 2B are summarized below.
  Composition of active material: $SiO_{0.1}$
  Angle $\theta1$ formed by first columnar portion and direction normal to current collector surface: 45°
  Angle $\theta2$ (direction identical with $\theta1$) formed by second columnar portion and direction normal to current collector surface: 60°
  Thickness of active material layer: 17 μm
  Center to center distance of columnar particles adjacent to each other: 9 μm
  Diameter of columnar particles: 5 μm
  Surface roughness Rz of current collector: 10 μm
  Porosity P: 33%

Test batteries 2A and 2B were fabricated in the same manner as in Example 1 except that Negative electrodes 2A and 2B thus obtained were used, respectively, and the charge and discharge characteristics were measured. The results are shown in Table 2.

|  | Charge and discharge efficiency | High-rate ratio | Capacity retention rate |
|---|---|---|---|
| Battery 2A | 99.9% | 92% | 93% |
| Battery 2B | 99.9% | 90% | 91% |

From the results shown in Table 2, it was found that with respect to the columnar particles grown in a shape as shown in FIG. 4 and FIG. 7, the effect of the invention could be achieved similarly. Accordingly, it was found that no particular limitation would be imposed on the shape of the columnar particles having a bend.

EXAMPLE 3

<i> Negative Electrode 3A

A negative electrode active material layer including columnar particles having first to tenth columnar portions was formed, whereby Negative electrode 3A was obtained. In the columnar particles of Negative electrode 3A, $\theta_1$ to $\theta_{10}$ were all controlled to 45°.

For the current collector, an electrolytic copper foil having a surface roughness Rz of 10 μm was used. The fixing table 54 was first slanted such that an angle a of 63° was formed with the horizontal plane, and in this state, an active material was vapor deposited for 3 minutes. Thereafter, the current collector was rotated by 180° clockwise about the rotation axis 58, and in this state, the active material was vapor deposited for 3 minutes while oxygen was introduced at a rate of 300 scam. Further, the same operation, that is, the operation in which the current collector was rotated by 180° clockwise about the rotation axis 58, and in this state, the active material was vapor deposited for 3 minutes, was repeated to the total of 8 times. A negative electrode was fabricated in the same manner as in Example 1 except the above.

Physical properties of Negative electrode 3A are summarized below.

Composition of active material: $SiO_{0.6}$

Angle $\theta_{1, 3, 5, 7, 9}$ (direction identical with $\theta_1$) formed by first, third, fifth, seventh and ninth columnar portions and direction normal to current collector surface: 45°

Angle $\theta_{2, 4, 6, 8, 10}$ (direction opposite to $\theta_1$) formed by second, forth, sixth, eighth and tenth columnar portions and direction normal to current collector surface: 45°

Thickness of active material layer: 17.8 μm

Center to center distance of columnar particles adjacent to each other: 10 μm

Diameter of columnar particles: 5 μm

Surface roughness Rz of current collector: 9.2 μm

Porosity P: 42%

Test battery 3A was fabricated in the same manner as in Example 1 except that Negative electrode 3A thus obtained was used, and the charge and discharge characteristics were measured. The results are shown in Table 3.

TABLE 3

| | Charge and discharge efficiency | High-rate ratio | Capacity retention rate |
|---|---|---|---|
| Battery 3A | 99.9% | 91% | 94% |

From the results above, it was observed that in the case where a bending point was formed in the columnar particles of active material, the cycle characteristics were improved as the number of bending point is increased. It is considered that the formation of a bend relieved the stress produced in the active material layer during the formation of columnar particles and suppressed the columnar particles from dropping from the current collector, whereby the cycle characteristics were improved.

EXAMPLE 4

The production apparatus 100 (available from ULVAC CORPORATION) provided with an electron beam heating means (not shown) as shown in FIG. 11A and FIG. 11B, that is, an apparatus similar to the production apparatus 50 as shown in FIG. 8A and FIG. 8B except the placed position of a target containing a material supplying source and an electron beam, was used to fabricate a negative electrode. Below the fixing table 54, the targets 105a and 105b were placed at a first position and a second position, respectively. The first position and the second position were symmetric to each other, with respect to a plane passing through the center C of the fixing table 54 and being orthogonal to the rotation axis 57. These targets were charged with silicon simple substance having a purity of 99.9999% (available from Kojundo Chemical Laboratory Co., Ltd.) as the material supplying source.

For the negative electrode current collector, a copper foil having a cut out size of 40 mm×40 mm and a plurality of protrusions on the surface thereof was used. The plurality of protrusions were formed in the following manner. First, a dry film resist available from Hitachi Chemical Co., Ltd. was laminated on a 14 μm thick rolled copper foil (Nippon Foil Mfg. Co., Ltd.). A photo mask having a 10 μm diameter dot pattern arranged at an interval of 5 μm was used to expose the dry resist film on the copper foil to light, and then the dry resist film was developed with an aqueous $NaHCO_3$ solution. After having been subjected to electrolytic copper plating, the copper foil was washed with water and dried, and then immersed in an aqueous sodium hydroxide solution to remove the resist. The surface roughness Rz of the resultant negative electrode current collector was 12 μm.

The fixing table 54 was slanted such that an angle a of 60° was formed with the horizontal plane. The angle b1 formed by the vertically downward direction U from the center C of the fixing table 54 and a direction from the center C to the first position, and the angle b2 formed by the direction U and a direction from the center C to the second position were both 30°.

While the target 105a placed at the first position was shielded with the shutter 107a, the material supplying source was evaporated from the target 105b placed at the second position. In this state, an active material was vapor deposited for 25 minutes (first vapor deposition process). While the target 105b placed at the second position was shielded with the shutter 107b, the material supplying source was evaporated from the target 105a placed at the first position. In this state, the active material was vapor deposited for 25 minutes (second vapor deposition process).

The accelerating voltage of the electron beam irradiated to each target was set at −8 kV, and the emission thereof was set at 250 mA. A vapor of elementary silicon was deposited together with oxygen in the chamber on the negative electrode current collector placed on the fixing table 54, whereby a negative electrode active material layer composed of a silicon oxide was formed. A negative electrode thus obtained was referred to as Negative electrode 4A. Thereafter Negative electrode 4A was cut in a size of 31 mm×31 mm. A lead terminal was connected with the back face of the current collector, the face not having the negative electrode active material layer.

The amount of oxygen contained in the resultant negative electrode active material layer was quantified by a combustion method. The result showed that the composition of the silicon oxide was $SiO_{0.3}$. Subsequently, the cross section of Negative electrode 4A was observed from various angles with an electron microscope. From the result of the observation, it was found that the active material layer was composed of columnar particles having one bend as shown in FIG. 6.

Since the fixing table 54 formed an angle a with the horizontal plane, the columnar particles were slanted in one direction with respect to the direction normal to the current collector. This direction is referred to as the direction X. In the direction X, the angle a formed by the columnar particles with the direction normal to the current collector was 37°. In addition, since the incident direction of a vapor of material supplying source formed angles β1 and β2 with the direction U, each columnar portion was slanted toward the direction Y orthogonal to the direction X. In the direction Y, the angle b1 formed by a first columnar portion and the direction normal to the current collector and the angle b2 formed by a second columnar portion and the direction normal to the current collector were both 17°.

The thickness t of the negative electrode active material layer was 22 μm, the width of the columnar particles was 11 μm at the center height of columnar particle, and the gap between columnar particles adjacent to each other was 4 μm in the direction Y. Test battery 4A was fabricated in the same manner as in Example 1 except that the negative electrode thus obtained was used.

COMPARATIVE EXAMPLE 2

A negative electrode was fabricated in the following manner.

For the current collector, a copper foil having a plurality of protrusions on the surface thereof as used in Example 4 was used. On this copper foil, vapor deposition was carried out using a production apparatus as shown in FIGS. 8A and 8B. The copper foil was fixed on the fixing table 54, and the angle a formed by the fixing table and the horizontal plane was set to 60°. The accelerating voltage of the electron beam irradiated to the target 55 was set at −8 kV, the emission thereof was set at 250 mA, and the vapor deposition time was set to 50 minutes. A vapor of elementary silicon was deposited together with oxygen in the chamber on the copper foil placed on the fixing table 54, whereby an active material layer composed of a compound containing silicon and oxygen was formed. A negative electrode thus obtained was referred to as Negative electrode 4B.

The amount of oxygen contained in the resultant active material layer was quantified by a combustion method. The result showed that the composition of the silicon oxide was $SiO_{0.3}$. Subsequently, the cross section of Negative electrode 4B was observed with an electron microscope. The result showed that the active material formed columnar particles. The angle a formed by the columnar particles and the current collector was 41°. The thickness t of the active material layer was 20 μm. The width of the columnar particles was 14 μm at the center height of columnar particle, and the gap between columnar particles adjacent to each other was 1 μm in the direction Y. Test battery 4B was fabricated in the same manner as in Example 4 except that the negative electrode thus obtained was used.

From the cross sectional SEM observation of Negative electrode 4A and Negative electrode 4B, the angles a, b1 and b2, the thickness of the active material layer, the width of the columnar particles at the center height of columnar particle and the gap in the direction Y between the columnar particles adjacent to each other were determined. The results are shown in Table 4.

TABLE 4

| Negative electrode | 4A | 4B |
|---|---|---|
| Angle β1 and Angle β2 (°) | 30 | — |
| Thickness of active material layer (μm) | 22 | 20 |
| Width of columnar particles (μm) | 11 | 14 |
| Gap between columnar particles adjacent to each other (μm) | 4 | 1 |
| Angle a (°) | 37 | 41 |
| Angle b1 (°) | 17 | — |
| Angle b2 (°) | 17 | — |

Evaluation Method 2

The charge and discharge operation similar to that in Evaluation method 1 was repeated to the total of 100 cycles except that the standing time after charge and the standing time after redischarge were changed to 30 minutes. The proportion of a whole discharge capacity at the 100th cycle relative to a whole discharge capacity in the initial cycle was determined as a percentage as a capacity retention rate. The results are shown in Table 5.

TABLE 5

|  | Capacity retention rate |
|---|---|
| Battery 4A | 93% |
| Battery 4B | 61% |

Tables 4 to 5 show that, compared with Battery 4B, Battery 4A has a considerably improved capacity retention rate. It is considered that this was because sufficient space was provided between the columnar particles adjacent to each other in Negative electrode 4A, and thus the stress produced by expansion due to charge was relieved. Further, it is considered that since the columnar particles had a bend, the stress was relieved at the contacting portions between the negative electrode active material and the current collector.

EXAMPLE 5

A negative electrode active material layer including columnar particles having two bends as shown in FIG. 4 was formed in the following manner.

A negative electrode was fabricated in the same manner as in Example 4 except that the deposition times of active material in the first vapor deposition process and the second vapor deposition process were changed to 17 minutes; and after the second vapor deposition process, the active material was further vapor deposited for 17 minutes (third vapor deposition process) in a state where the material supplying source was evaporated from the target 105b placed at the second position while the target 105a placed at the first position was shielded with the shutter 107a. The negative electrode thus obtained was referred to as Negative electrode 8A.

Negative electrodes 5A, 6A, 7A, 9A and 10A were obtained in the same manner as in Negative electrode 8A except that the angle β1 formed by the direction U and the direction from the center C to the first position and the angle β2 formed by the direction U and the direction from the center C to the second position were both changed to 55°, 48°, 40°, 20° and 12°.

From the cross sectional SEM observation of Negative electrodes 5A to 10A, the angles a, b1, b2 and b3, the thickness of the active material layer, the width of columnar particles at the center height of columnar particle and the gap in the direction Y between the columnar particles adjacent to each other were determined. The results are shown in Table 6. The angle a is an angle formed by the columnar particles and the direction normal to the current collector in the direction X; and the angles b1, b2 and b3 are angles that a first columnar portion, a second columnar portion and a third columnar portion form with the direction normal to the current collector in the direction Y, respectively.

TABLE 6

| Negative electrode | 5A | 6A | 7A | 8A | 9A | 10A |
|---|---|---|---|---|---|---|
| Angle β1 and Angle β2 (°) | 55 | 48 | 40 | 30 | 20 | 12 |
| Thickness of active material layer (μm) | 21 | 22 | 23 | 23 | 23 | 22 |
| Width of columnar particles (μm) | 10 | 10 | 10 | 10 | 10 | 11 |
| Gap between columnar particles adjacent to each other (μm) | 5 | 5 | 5 | 5 | 5 | 4 |

TABLE 6-continued

| Negative electrode | 5A | 6A | 7A | 8A | 9A | 10A |
|---|---|---|---|---|---|---|
| Angle a (°) | 36 | 37 | 37 | 37 | 38 | 39 |
| Angle b1 (°) | 36 | 30 | 23 | 17 | 11 | 7 |
| Angle b2 (°) | 36 | 30 | 23 | 17 | 11 | 7 |
| Angle b3 (°) | 36 | 30 | 23 | 17 | 11 | 7 |

Test batteries 5A, 6A, 7A, 8A, 9A and 10A were fabricated in the same manner as in Example 4 except that Negative electrodes 5A, 6A, 7A, 8A, 9A and 10A thus obtained were used. The batteries were evaluated in the same manner as in Example 4. The results are shown in Table 7.

TABLE 7

|  | Capacity retention rate |
|---|---|
| Battery 5A | 65% |
| Battery 6A | 86% |
| Battery 7A | 93% |
| Battery 8A | 94% |
| Battery 9A | 93% |
| Battery 10A | 85% |

From the results shown in Tables 6 and 7, it was found that with respect to the columnar particles grown in a shape as shown in FIG. 4, the effect of the invention could be achieved similarly. In particular, when the angle b formed by each columnar portion and the direction normal to the current collector in the direction Y was in the range of a>0.2≦b≦a× 0.8 (48° to 12°), the effect became significant.

Industrial Applicability

The invention, although being applicable to various types of lithium secondary batteries, is particularly useful in a lithium secondary battery that is required to have a high capacity and favorable cycle characteristics. The shape of a lithium secondary battery to which the invention is applicable may be any shape such as a coin shape, a button shape, a sheet shape, a cylindrical shape, a flat shape and a prismatic shape, although it is not particularly limited thereto. Further, the type of the electrode assembly comprising a positive electrode, a negative electrode and a separator may be a wound type or a layered type. Furthermore, the size of the battery may be a small size for use in a small portable equipment etc. or a large size for use in an electric vehicle etc. The lithium secondary battery of the invention is applicable as a power source for portable information terminals, portable electronic devices, electric power storage devices for household use, two-wheeled motor vehicles, electric vehicles, hybrid electric vehicles, etc., although the application is not particularly limited thereto.

The invention claimed is:

1. An electrode for a lithium secondary battery comprising a sheet-like current collector and an active material layer carried on said current collector, wherein
said active material layer includes a plurality of columnar particles having at least one bend,
said columnar particles are capable of absorbing and desorbing lithium,
said current collector has a surface roughness Rz of 0.1 to 50 μm,
a porosity of P of said active material layer is 10%≦P≦70%, and
a gap is formed between said columnar particles adjacent to each other, said gap extending from contacting portions of said current collector and said columnar particles adjacent to each other to tips of said columnar particles adjacent to each other.

2. The electrode for a lithium secondary battery in accordance with claim 1, wherein an angle $\theta_1$ formed by a growth direction of said columnar particles from a bottom to a first bend of said columnar particles, and a direction normal to said current collector is 10° or more and less than 90°.

3. The electrode for a lithium secondary battery in accordance with claim 1, wherein when $\theta_{n+1}$ is an angle formed by a growth direction of said columnar particles from an n-th bend counted from a bottom of said columnar particles to an (n+1)-th bend, and the direction normal to said current collector, and n is an integer of 1 or more, said $\theta_{n+1}$ is 0° or more and less than 90°.

4. The electrode for a lithium secondary battery in accordance with claim 1, wherein said columnar particles each have two or more bends.

5. The electrode for a lithium secondary battery in accordance with claim 4, wherein said columnar particles each have a zigzag shape.

6. The electrode for a lithium secondary battery in accordance with claim 4, wherein said columnar particles each have a helical shape.

7. The electrode for a lithium secondary battery in accordance with claim 1, wherein said columnar particles include element M capable of forming a solid solution with lithium, and element M is at least one selected from the group consisting of carbon, silicon, germanium, tin, indium, zinc and bismuth.

8. The electrode for a lithium secondary battery in accordance with claim 7, wherein said columnar particles include at least one selected from the group consisting of a substance composed of silicon and a silicon oxide.

9. The electrode for a lithium secondary battery in accordance with claim 1, wherein said columnar particles include an oxide, a solid solution or a composite material of these including a transition metal element, and said transition metal is at least one selected from the group consisting of Co, Ni and Mn.

10. The electrode for a lithium secondary battery in accordance with claim 9, wherein the oxide, the solid solution or the composite material of these including said transition metal element includes $LiCoO_2$, $LiNiO_2$, $LiMn_2O_4$, $LiCo_{x1}Ni_{y1}Mn_{z1}O_2$ (where 0<x1, y1, z1<1 and x1+y1+z1=1), $LiCo_{x2}Ni_{y2}Al_{z2}O_2$ (where 0<x2, y2, z2<1 and x2+y2+z2=1) and $LiNi_{y3}Mn_{z3}O_2$ (where 0<y3, z3<1 and y3+z3=1).

11. A lithium secondary battery comprising the electrode for a lithium secondary battery in accordance with claim 1, a counter electrode and an electrolyte having ion conductivity interposed therebetween.

12. The electrode for a lithium secondary battery in accordance with claim 1, wherein said surface roughness Rz is 0.3 to 30 μm.

13. The electrode for a lithium secondary battery in accordance with claim 1, wherein said porosity P is 30%≦P≦60%.

14. The electrode for a lithium secondary battery in accordance with claim 1, wherein said plurality of columnar particles have two or more bends, said bends being points at which a growth direction of said columnar particle becomes discontinuous.

15. The electrode for a lithium secondary battery in accordance with claim 1, wherein said plurality of columnar particles have four or more bends, said bends being points at which a growth direction of said columnar particle becomes discontinuous.

16. An electrode for a lithium secondary battery comprising:
   a current collector; and
   an active material layer carried on said current collector, said active material layer including a plurality of columnar particles, each columnar particle being capable of absorbing and desorbing lithium and having at least first and second portions, said first portion having a uniform growing direction $\theta_1$ with a direction normal to the surface of said current collector and said second portion having a uniform growing direction $\theta_2$ with a direction normal to the surface of said current collector so that said first and second portions constitute a bend.

17. The electrode for a lithium secondary battery of claim 16, wherein said current collector has a surface roughness Rz of 0.1 to 50 μm.

18. The electrode for a lithium secondary battery of claim 16, wherein said active material layer has a porosity of $10\% \leq P \leq 70\%$.

* * * * *